US012771655B2

(12) United States Patent
Yang

(10) Patent No.: US 12,771,655 B2
(45) Date of Patent: Oct. 20, 2026

(54) NETWORK SWITCH AND NETWORK ARCHITECTURE FOR NETWORK COUPLING AND BACKUP

(71) Applicant: Moxa Inc., New Taipei City (TW)

(72) Inventor: Tsai-Wei Yang, New Taipei City (TW)

(73) Assignee: Moxa Inc., New Taipei City (TW)

( * ) Notice: Subject to any disclaimer, the term of this patent is extended or adjusted under 35 U.S.C. 154(b) by 419 days.

(21) Appl. No.: 18/510,624

(22) Filed: Nov. 15, 2023

(65) Prior Publication Data

US 2025/0088471 A1 Mar. 13, 2025

(30) Foreign Application Priority Data

Sep. 13, 2023 (TW) ................................ 112134838

(51) Int. Cl.

| | |
|---|---|
| ***H04L 12/00*** | (2006.01) |
| ***H04L 41/0654*** | (2022.01) |
| ***H04L 49/55*** | (2022.01) |
| ***H04L 49/552*** | (2022.01) |

(52) U.S. Cl.

CPC ........ *H04L 49/552* (2013.01); *H04L 41/0654* (2013.01); *H04L 49/555* (2013.01)

(58) Field of Classification Search

CPC ............... H04L 49/552; H04L 41/0654; H04L 48/555; H04L 43/0811; H04L 41/0668; H04L 41/0893; H04L 49/557; H04L 41/0663; H04L 45/28; H04L 49/55; H04L 49/113

USPC .......................................................... 370/219

See application file for complete search history.

(56) References Cited

U.S. PATENT DOCUMENTS

| | | | | |
|---|---|---|---|---|
| 9,960,953 | B2 * | 5/2018 | Sufleta | H04L 41/0654 |
| 10,686,734 | B2 * | 6/2020 | Viradiya | H04L 49/604 |
| 10,873,498 | B2 * | 12/2020 | Satapathy | G06F 11/2035 |
| 2004/0076160 | A1 | 4/2004 | Phaltankar | |
| 2010/0246388 | A1 * | 9/2010 | Gupta | H04L 45/76 370/392 |
| 2015/0271103 | A1 * | 9/2015 | Thayalan | H04L 49/354 370/217 |

(Continued)

FOREIGN PATENT DOCUMENTS

| | | | | |
|---|---|---|---|---|
| CA | 1237802 A * | 6/1988 | | H04L 49/15 |
| EP | 2 573 977 A1 | 3/2013 | | |

(Continued)

*Primary Examiner* — Frantz Coby

(74) *Attorney, Agent, or Firm* — Winston Hsu

(57) ABSTRACT

A network architecture for network coupling and backup includes a backup network switch and at least one primary network switch configured in a switch group of a main network, for executing a network coupling redundancy method. The method includes sending, by the backup network switch a first control packet periodically; sending, by the at least one primary switch, a first ACK packet in response to receiving the first control packet; performing, by the backup network switch, link change according to a first condition; sending, by the at least one primary network switch, a second control packet according a second condition; sending, by the backup switch, a second ACK packet and performing link change according to the second control packet in response to receiving the second control packet; and performing, by the primary switch, link change in response to receiving the second ACK packet.

21 Claims, 14 Drawing Sheets

(56) References Cited

U.S. PATENT DOCUMENTS

| | | | | |
|---|---|---|---|---|
| 2016/0191424 | A1* | 6/2016 | Srinivasan | H04L 49/3045 370/359 |
| 2017/0214566 | A1* | 7/2017 | Sufleta | H04L 41/0654 |
| 2017/0288947 | A1 | 10/2017 | Kaniampady Sebastian | |
| 2017/0302473 | A1 | 10/2017 | Tochio | |
| 2018/0077270 | A1* | 3/2018 | Guim Bernat | H04L 1/1642 |
| 2019/0097949 | A1* | 3/2019 | Viradiya | H04L 49/70 |
| 2019/0123956 | A1* | 4/2019 | Satapathy | H04L 49/356 |
| 2024/0114357 | A1* | 4/2024 | Elsherif | H04W 24/10 |

FOREIGN PATENT DOCUMENTS

| | | | |
|---|---|---|---|
| EP | 2566111 | A1 | 3/2013 |
| EP | 3 471 343 | A1 | 4/2019 |
| JP | 2001-144761 | A | 5/2001 |
| JP | 2017-195483 | A | 10/2017 |
| TW | 200820664 | | 5/2008 |
| TW | I321415 | B | 3/2010 |
| TW | I356616 | B | 1/2012 |
| TW | I459757 | B | 11/2014 |
| TW | 201906375 | A | 2/2019 |
| TW | I717778 | B | 2/2021 |

* cited by examiner

NETWORK SWITCH AND NETWORK ARCHITECTURE FOR NETWORK COUPLING AND BACKUP

BACKGROUND OF THE INVENTION

1. Field of the Invention

The present invention relates to a network coupling redundancy method, network switch and network architecture, and more particularly, to a network coupling redundancy method, network switch and network architecture using a backup network switch to backup multiple primary network switches in network coupling.

2. Description of the Prior Art

With the burgeoning demand for capacity and cost-efficiency in the industry, network connectivity for production equipment has become a growing trend. The network connectivity enables cross-machine data collection and analysis, enhancing the speed, flexibility, and efficiency of the manufacturing processes. It also leads to the production of higher quality products and cost reduction. However, traditional industrial environments often consists of multiple independent Local Area Networks (LANs), each composed of various redundant network technologies, causing complicate integration and management. In this situation, network coupling technology has been proposed, which connects multiple LANs to facilitate data and function sharing or integration across different LANs. This technology solves the interoperability and compatibility issues across different LANs and improves system efficiency and reliability.

In order to prevent network inoperability due to a single link failure during network coupling, a second link is generally built as a backup link to bolster the reliability and stability of network coupling. However, current solutions predominantly employ two network switches for network coupling, one of which operates as the primary network switch while the other stands by as a backup network switch. In other words, connecting each subnet requires two network switches. This approach can be problematic when connecting a large number of subnets as it not only escalates construction costs but also increases the volume of related control packets, thereby impacting performance. Moreover, in industrial control networks, there are often multiple different subnets that need to be connected to the backbone network. Therefore, there is a pressing need for further improvements to enhance efficiency and reduce costs.

SUMMARY OF THE INVENTION

Therefore, the present invention aims at providing a one-to-many redundancy method and network switch, so as to realize a redundant mechanism while reducing costs and improving efficiency when performing network coupling.

An embodiment of the present invention discloses a primary network switch. The primary network switch is configured in a switch group of a main network and coupled to at least one first subnet of a subnet group through at least one first link. The primary network switch includes a processing unit and a storage unit. The processing unit is configured to execute a program code. The storage unit is coupled to the processing unit and configured to store the program code to instruct the processing unit to execute a network coupling redundancy method. The network coupling redundancy method includes receiving a first control packet from a backup network switch of the switch group; in response to not receiving the first control packet, performing link change according to a first condition; in response to receiving the first control packet, sending a first acknowledgment (ACK) packet comprising a connection status of the at least one first subnet; sending a second control packet to the backup network switch; and in response to sending the second control packet, receiving a second ACK packet from the backup network switch, and performing link change after receiving the second ACK packet.

An embodiment of the present invention further discloses a backup network switch. The backup network switch is configured in a switch group of a main network and coupled to at least one first subnet of a subnet group through at least one first link. The backup network switch includes a processing unit and a storage unit. The processing unit is configured to execute a program code. The storage unit is coupled to the processing unit and configured to store the program code to instruct the processing unit to execute a network coupling redundancy method. The network coupling redundancy method includes periodically sending a first control packet comprising a connection status of the at least one first subnet to at least one primary network switch of the switch group; in response to sending the first control packet, at least receiving one first acknowledgement (ACK) packet from the at least one primary network switch; performing link change according to a first condition; and in response to receiving a second control packet from the at least one primary network switch, sending a second ACK packet and performing link change according to the second control packet.

An embodiment of the present invention further discloses a network architecture for network coupling and backup, and the network architecture includes a plurality of subnets and a main network. The plurality of subnets belongs to a plurality of subnet groups. The main network includes a plurality of switch groups, and each switch group of the plurality of switch groups is coupled to a subnet group of the plurality of subnet groups. The each switch group of the plurality of switch groups includes at least one primary network switch and a backup network switch. The at least one primary network switch is coupled to the subnet group, and each primary network switch of the at least one primary network switch is coupled to at least one first subnet of the subnet group through at least one first link. The backup network switch is coupled to the subnet group through at least one second link. The each switch group of the plurality of switch groups is configured to execute a network coupling redundancy method, and the network coupling redundancy method includes sending, by the backup network switch, a first control packet comprising a connection status of the at least one second link periodically; in response to receiving the first control packet, the each primary network switch of the at least one primary network switch sending a first acknowledgement (ACK) packet comprising a connection status of the at least one first link; performing, by the backup network switch, link change according to a first condition; sending, by the at least one primary network switch, a second control packet according to a second condition; in response to receiving the second control packet, the backup network switch sending a second ACK packet and performing link change according to the second control packet; and in response to receiving the second ACK packet, the at least one primary network switch performing link change.

These and other objectives of the present invention will no doubt become obvious to those of ordinary skill in the art after reading the following detailed description of the preferred embodiment that is illustrated in the various figures and drawings.

DETAILED DESCRIPTION

Certain t are used throughout the description and following claims to refer to particular components. As one skilled in the art will appreciate, hardware manufacturers may refer to a component by different names. This document does not intend to distinguish between components that differ in name but not function. In the following description and in the claims, the terms “include” and “comprise” are utilized in an open-ended fashion, and thus should be interpreted to mean “include, but not limited to”. Also, the term “couple” is intended to mean either an indirect or direct electrical connection. Accordingly, if one device is coupled to another device, that connection may be through a direct electrical connection, or through an indirect electrical connection via other devices and connections.

Figure 1:
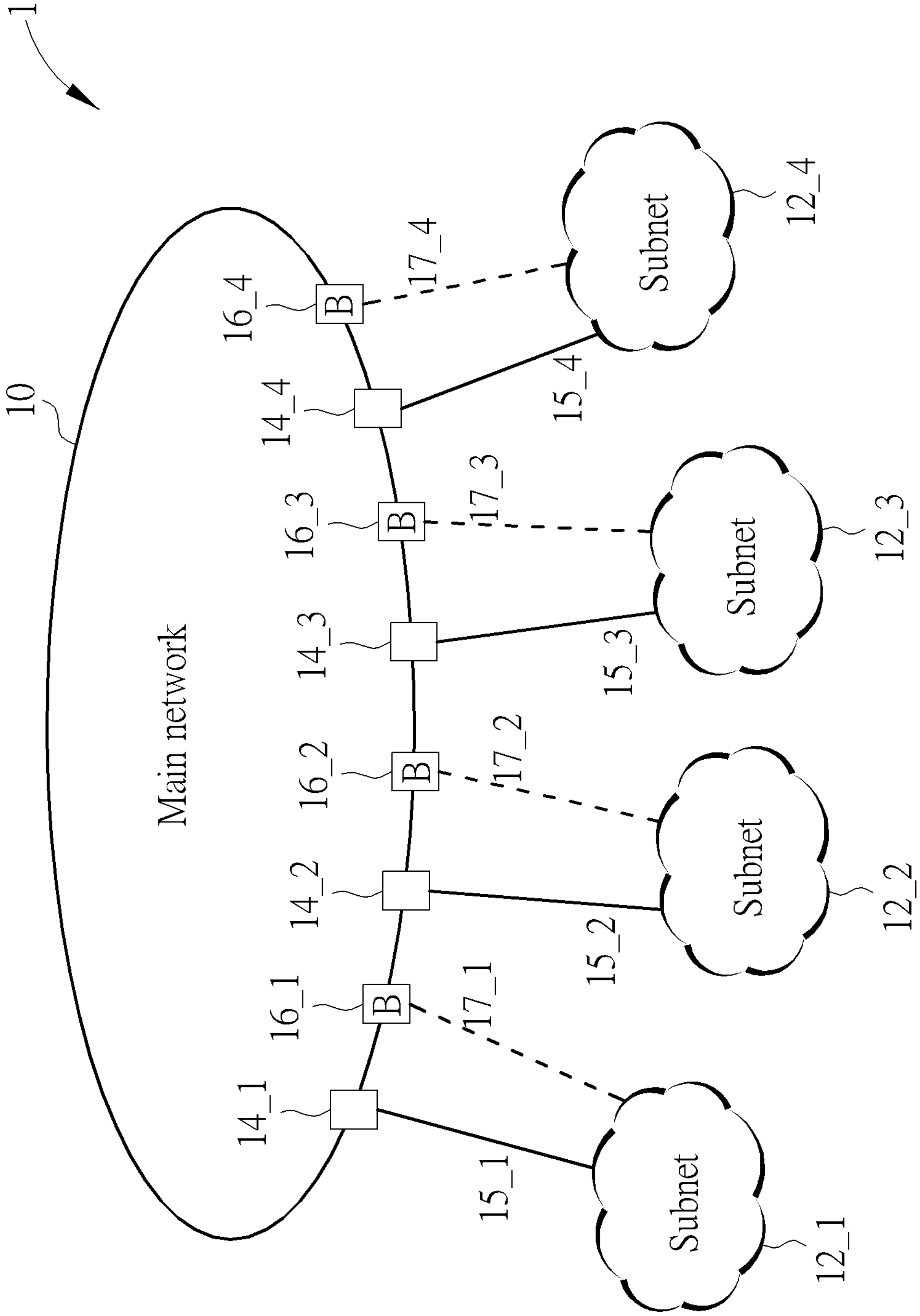
FIG. 1 is a schematic diagram of a network system.

Please refer to FIG. 1, which is a schematic diagram of a network system 1. In the network system 1, a main network 10 is coupled to a plurality of subnets 12_1-12_4. Specifically, the main network 10 is coupled to the subnets 12_1-12-4 through a plurality of primary links 15_1-15_4 via a plurality of primary network switches 14_1-14_4, and the primary network 10 is also coupled to the subnets 12_1-12_4 through a plurality of backup links 17_1-17_4 via a plurality of backup network switches 16_1-16_4. The plurality of backup network switches 16_1-16_4 and the plurality of backup links 17_1-17_4 are in a standby state as backup for the plurality of primary network switches 14_1-14_4 and the plurality of primary links 15_1-15_4. As can be seen from FIG. 1, the network system 1 adopts a one-to-one network coupling redundancy method. That is to say, for each subnet connected to the main network 10, a main network switch and a backup network switch are required to be configured correspondingly so as to ensure the reliability and stability of network coupling. In this situation, when a large number of subnets need to be connected, the number of network switches required grows doubly. In addition, as the number of network switches increases, the number of control packets sent from the network switches also increases, which impacts performance.

Therefore, the present invention provides a network coupling redundancy method to enable a backup network switch to simultaneously backup multiple operating primary network switches connected to subnets. Moreover, by grouping the backup network switch and the corresponding primary network switches into the same group (hereinafter referred to as switch group), the main network may connect multiple different subnet groups through multiple switch groups. In this architecture, the network switches only need to process control packets belonging to the same switch group, and the control packets are capable of carrying the connection status of multiple subnets at the same time, further reducing the amount of control packets to be processed.

Figure 2:
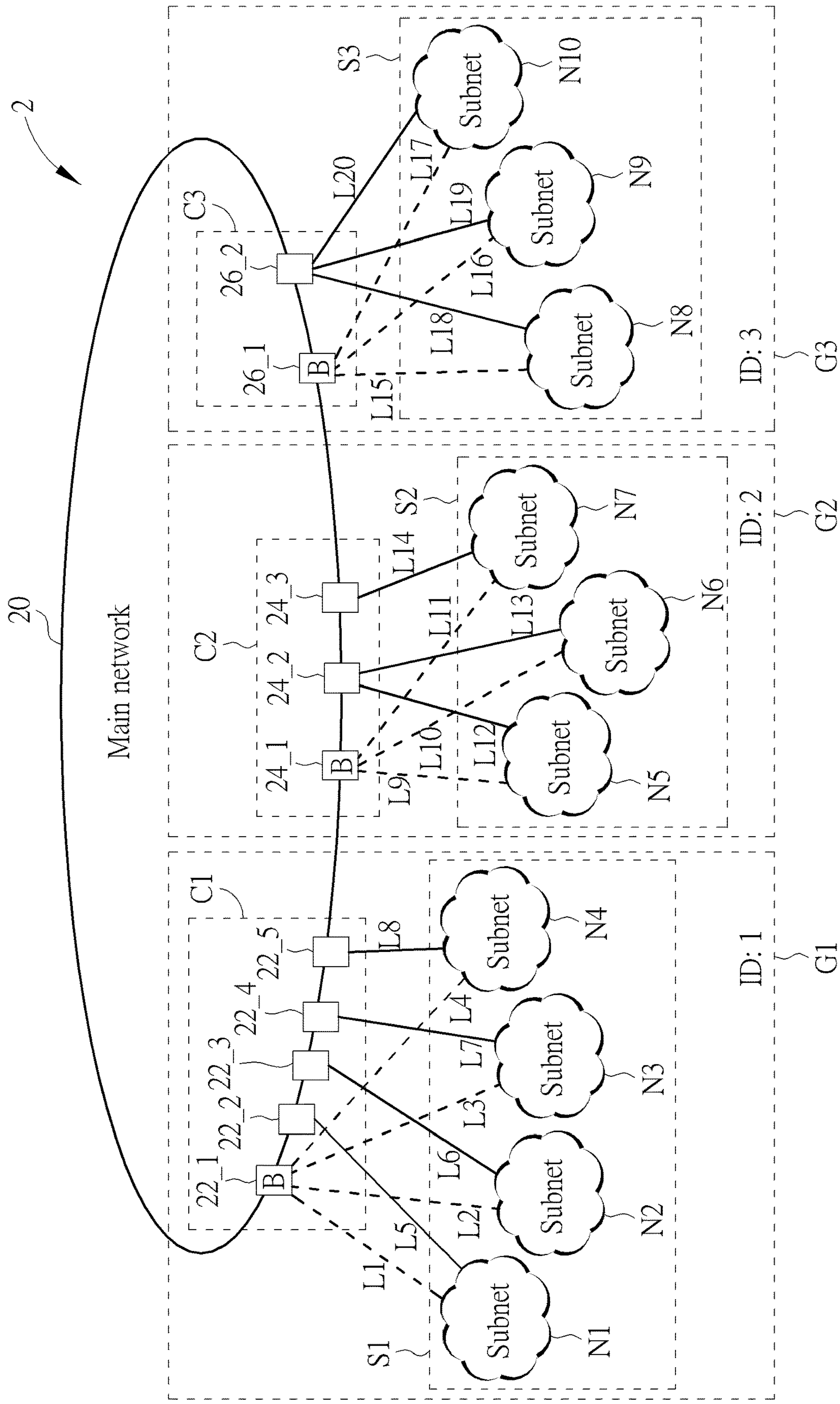
FIG. 2 is a schematic diagram of a network system according to an embodiment of the present invention.

Please refer to FIG. 2, which is a schematic diagram of a network system 2 according to an embodiment of the present invention. In this embodiment, the network system 2 comprises a main network 20 and a plurality of subnets N1-N10 and may be divided into a plurality of groups G1-G3. The main network 20 comprises a plurality of backup network switches 22_1, 24_1 and 26_1 in a standby state and a plurality of primary network switches 22_2-22_5, 24_2-24_3 and 26_2 used for data forwarding. It should be noted, the main network 20 may be of various types of network topologies and applicable to different redundancy protocols. Moreover, the number of subnets, the number of groups, and the number of network switches shown in FIG. 2 are only for illustrative purposes and are not limited thereto, which should be adjusted or modified depending on the actual requirements by those skilled in the arts.

In detail, the group G1 comprises a switch group C1 and a subnet group S1. The switch group C1 comprises a backup network switch 22_1 and a plurality of primary network switches 22_2-22_5, and the subnet group S1 comprises subnets N1-N4. The plurality of primary network switches 22_2-22_5 are coupled to the subnets N1-N4 through a plurality of links L5-L8 respectively, and the backup network switch 22_1 serves as a backup for the primary network switches 22_2-22_5 and is coupled to the subnets N1-N4 through a plurality of links L1-L4. Similarly, the group G2 comprises a switch group C2 and a subnet group S2. The switch group C2 comprises a backup network switch 24_1 and a plurality of primary network switches 24_2-24_3, and the subnet group S2 comprises subnets N5-N7. The primary network switch 24_2 is coupled to the subnets N5 and N6 through links L12 and L13 respectively, and the primary network switch 24_3 is coupled to the subnet N7 through a link L14. The backup network switch 24_1 serves as a backup for the primary network switches 24_2 and 24_3 and is coupled to the subnets N5-N7 through links L9-L11. The group G3 comprises a switch group C3 and a subnet group S3. The switch group C3 comprises a backup network switch 26_1 and a primary network switch 26_2, and the subnet group S3 comprises subnets N8-N10. The primary network switch 26_2 is coupled to the subnets N8-N10 through links L18-L20 respectively. The backup network switch 26_1 serves as a backup for the primary network switch 26_2 and is coupled to the subnets N8-N10 through links L15-L17.

For illustrative purposes, the network system 2 shown in FIG. 2 comprises different network coupling types. Specifically, in the group G1, the subnets N1-N4 are connected to the main network 20 by the primary network switches 22_2-22_5 respectively and perform data forwarding, while the backup network switch 22_1 connects all the subnets N1-N4 in the group G1 to the main network 20 and serves as a standby for all primary network switches 22_2-22_5 in the group G1. In the group G3, all the subnets N8-N10 are connected to the main network 20 by the same primary network switch 26_2 and perform data forwarding, while the backup network switch 26_1 connects all the subnets N8-N10 in the group G3 to the man network 20 and serves as a backup for the primary network switch 26_2. In addition, in the group G2, the primary network switch 24_2 is connected to two subnets N5 and N6, and the primary network switch 24_3 is connected to another subnet N7 in the same group G2. The backup network switch 24_1 is connected to the subnets N5-N7 and serves as a backup for the two primary network switches 24_2 and 24_3. In other words, within the same group, the primary network switches may be connected to the subnets in a one-to-one (such as the group G1), one-to-many (such as the group G3) or mixed (such as the group G2) manner with a backup network switch for backup.

In the network system 2, the network switches in the same switch group transmit information by exchanging control packets (frames) to obtain the connection status between other network switches and the connected subnets. In the embodiment of the present invention, the control packets may be transmitted in the main network 20 or the subnets N1-N10 by multicast, and a group identification (ID) of the group may be carried in the destination address in the control packet header for identification by the network switches in the main network 20. The network switches may merely read the control packets with the same group ID thereto, and may forward control packets with different group ID directly without processing.

Figure 3:
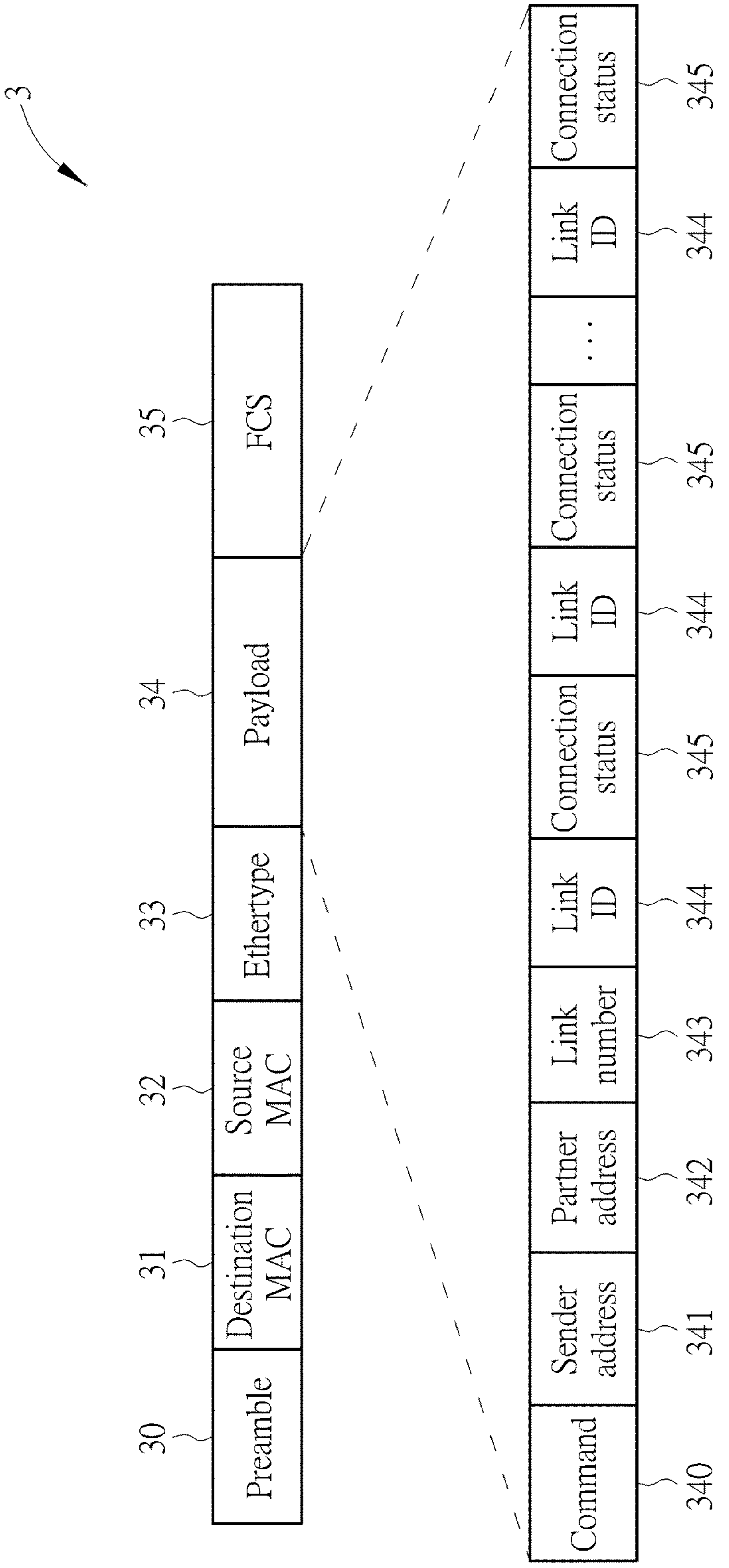
FIG. 3 is a schematic diagram of a control packet according to an embodiment of the present invention.

Please refer to FIG. 3, which is a schematic diagram of a control packet 3 according to an embodiment of the present invention. The control packet 3 may be used in the network system 2 and comprise a header 30-33, a payload 34 and a frame check sequence (FCS) 35. The header 30-33 may comprise a preamble 30, a destination address (Destination MAC) 31, a source address (Source MAC) 32, and an Ethertype 33 according to the carried data. Specifically, the destination address 31 may be a media access control (MAC) address and transmitted as multicast address in the main network 20 as identifications for different groups, where a group ID may be carried into a specific byte or bits of the MAC address, or a plurality of specific MAC addresses may be used to stand for different groups, and are not limited thereto. Taking the example of different group ID being carried in a specific byte of a specific MAC address, when the backup network switch 22_1 belonging to the group G1 and having the group ID of 1 sends a control packet, the control packet with the destination address of "xx-xx-xx-xx-xx-01" may be sent. When the backup network switch 22_1 receives the control packet with the destination address of "xx-xx-xx-xx-xx-01", the backup network switch 22_1 may immediately determine that the control packet is sent from another network switch with the same group ID of 1. Therefore, the content of the control packet should be read and processed. When the backup network switch 22_1 receives a control packet with the destination address of "xx-xx-xx-xx-xx-02" or "xx-xx-xx-xx-xx-03", the backup network switch 22_1 may determine that the control packet is sent by the network switch with group ID of 2 or 3. Therefore, there is no need to process the control packet and should forward the control packet directly. Accordingly, the network switches of the main network 20 may identify the control packets from the network switches within the same group and read the control packets to exchange information with each other. It should be noted, carrying a group ID in a specific byte of a MAC address as a multicast address is merely one of the implementations for identifying groups in the embodiments of the present invention and is not limited thereto, and those skilled in the art may adopt appropriate methods for identifying different groups by multicast addresses according to actual needs.

Furthermore, the payload 34 of the control packet 3 comprises a command 340, a sender address 341, a partner address 342, a link number 343, at least one link ID 344 and the corresponding connection status 345. Specifically, the command 340 is used to identify different types of control packets; the sender address 341 is a MAC address of a primary network switch or a backup network switch that sends the control packet; the partner address 342 is a MAC address of the destination of the control packet. For example, when a primary network switch sends a control packet, the partner address 342 may be the MAC address of the network switch belonging to the same group. In addition, the link number 343 is the number of link connection statuses carried by the control packet; the link ID 344 is a subnet ID connected by the link, and the connection status 345 is the connection status of the link corresponding to the subnet (i.e., a connection status of a subnet). The connection status 345 may be determined to be link-up or link-down according to whether to receive an electric signal of a link. In should be noted, the control packet 3 only illustrates the necessary fields for implementing the embodiment of the present invention, and is not limited thereto. Those skilled in the art need to adjust the specific content of the control packet 3 according to actual needs.

Figure 4:
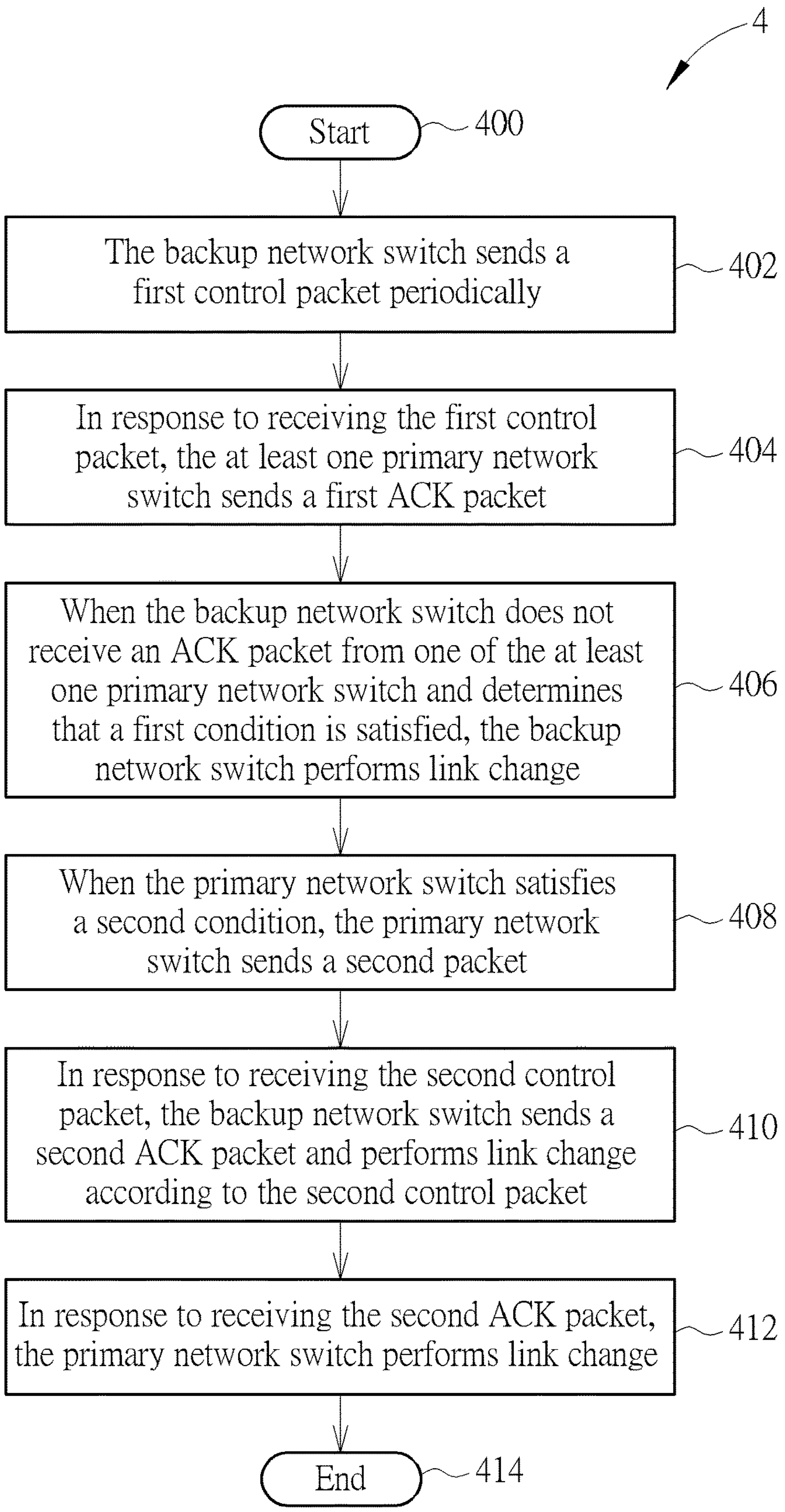
FIG. 4 is a schematic diagram of a network coupling redundancy process according to an embodiment of the present invention.

The groups G1-G3 in the embodiment of the present invention may be regarded as the smallest unit for implementing the network coupling redundancy method in the network system 2. In other words, each group is coupled to a subnet group for the main network 20, where the data forwarding is performed by at least one primary network switch, and the backup is performed by one backup network switch on standby. The network coupling redundancy method in the network system 2 may be summarized into a network coupling redundancy process 4 as shown in FIG. 4. The network coupling redundancy process 4 includes the following steps:

Step 400: Start.

Step 402: The backup network switch sends a first control packet periodically.

Step 404: In response to receiving the first control packet, the at least one primary network switch sends a first ACK packet.

Step 406: When the backup network switch does not receive an ACK packet from one of the at least one primary network switch and determines that a first condition is satisfied, the backup network switch performs link change.

Step 408: When the primary network switch satisfies a second condition, the primary network switch sends a second packet.

Step 410: In response to receiving the second control packet, the backup network switch sends a second ACK packet and performs link change according to the second control packet.

Step 412: In response to receiving the second ACK packet, the primary network switch performs link change.

Step 414: End.

According to the network coupling redundancy process 4, the backup network switch periodically sends a first control packet (Step 402) and determines a status of the primary network switches according to a first ACK packet acknowledged by the primary network switch (Step 404). When a first condition is satisfied, the primary network switch may be determined to be invalid (such as failure or fails to connect), and link change should be performed for backup (Step 406). Furthermore, when a second condition is satisfied, the primary network switch determines that link change should be performed, thus sending a second control packet to the backup network switch (Step 408). The backup network switch then responds a second ACK packet to the second control packet, and performs link change according to the second control packet (Step 410). Finally, after receiving the second ACK packet, the primary network switch performs link change (Step 412). For the contents of the first control packet, the first ACK packet, the second control packet and the second ACK packet mentioned above, please refer to the control packet 3 in FIG. 3, which illustrates the specific format and contents of the control packet used in the present invention.

Figure 5B:
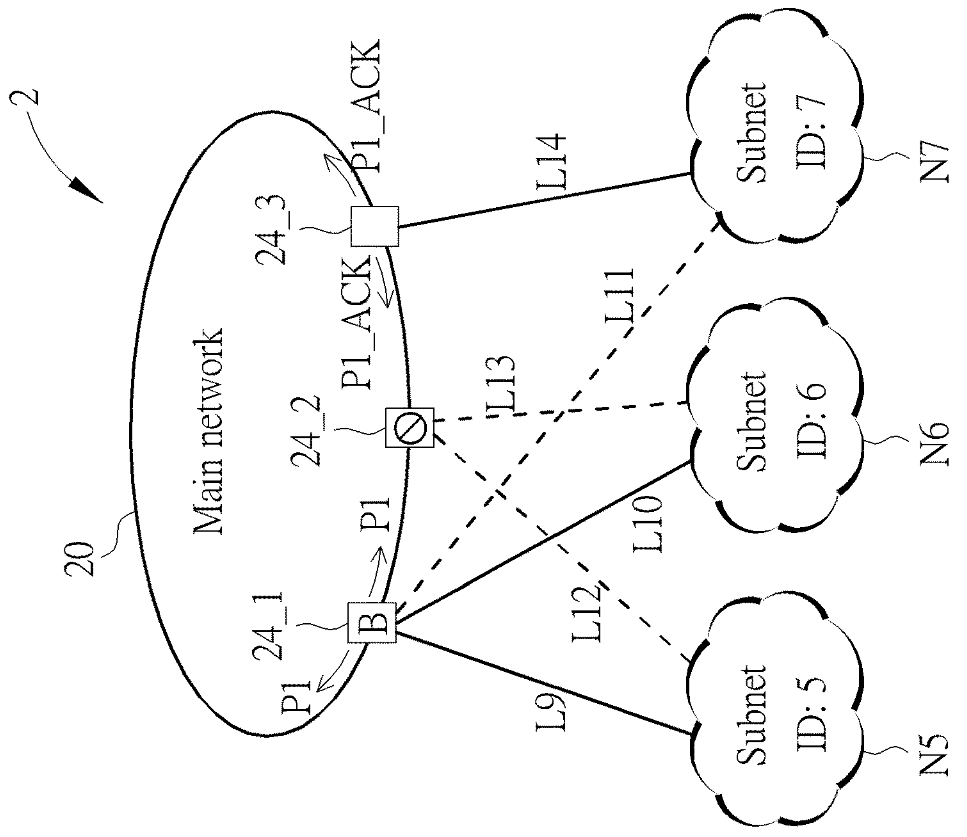
FIG. 5A and FIG. 5B are schematic diagrams of an implementation of one of the network coupling redundancy processes for the group according to an embodiment of the present invention.
Figure 5A:
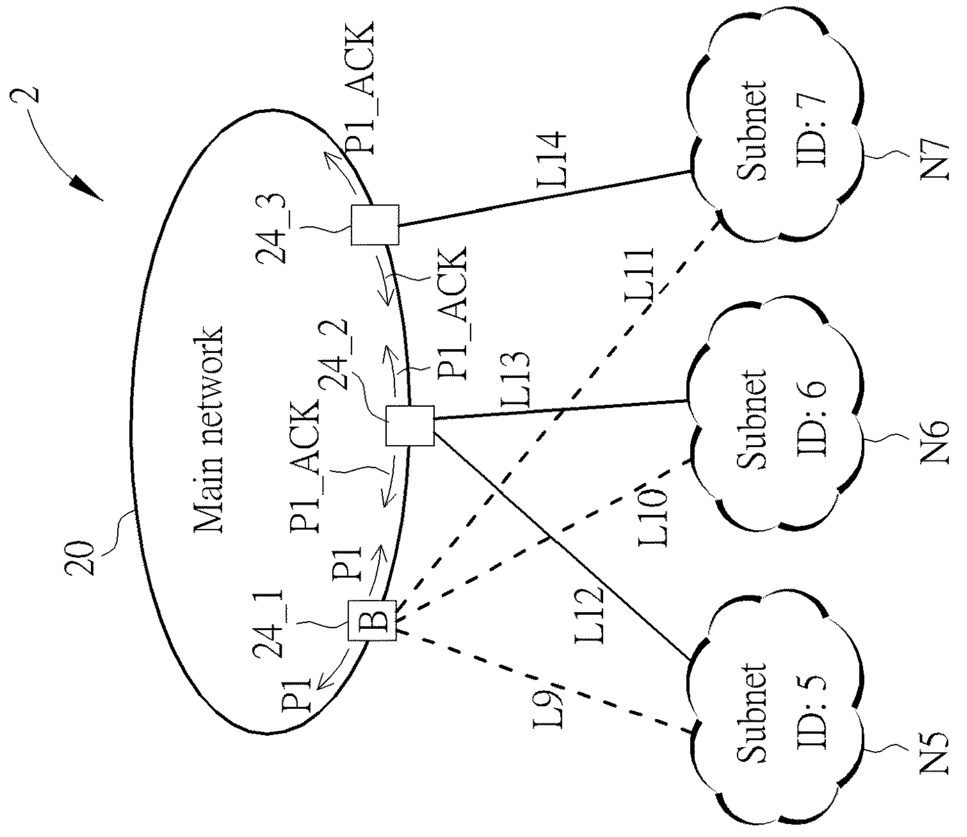

Specifically, please refer to FIG. 5A and FIG. 5B, which illustrate an implementation of the group G2 of the network system 2 performing network coupling redundancy process 4. Please refer to FIG. 5A first. In Step 402, the backup network switch 24_1 periodically sends a first control packet P1 to the main network 20 or the subnets N5-N7 (only the situation where the first control packet P1 is sent to the main network 20 is illustrated), and the contents of the payload 34 of the first control packet P1 are shown in Table 1 below. In Table 1, the sender address 341 is the MAC address "MAC1" of the backup network switch 24_1. The link number 343 is the number of the subnets connected by the backup network switch 24_1, and the 3 pairs of the link ID 344 and the connection status 345 respectively carry the connection statuses of links L9-L11 between the backup network switch 24_1 and the subnets N5-N7. As shown in Table 1, when the connection statuses 345 are all link-up, it means that the backup network switch 24_1 is able to perform link change for the subnets N5-N7 at any time for backup. It should be noted that the first control packet P1 needs to carry the connection status of all the subnets N5-N7 connected to the backup network switch 24_1.

TABLE 1

| Command 340 | CM1 |
|---|---|
| Sender address 341 | MAC1 |
| Partner address 342 | — |
| Link number 343 | 3 |
| Link ID 344 | 5 |
| Connection status 345 | link-up |
| Link ID 344 | 6 |
| Connection status 345 | link-up |
| Link ID 344 | 7 |
| Connection status 345 | link-up |

Please continue to refer to FIG. 5A. In Step 404, after receiving the first control packet P1, the primary network switches 24-2 and 24-3 should send a first ACK packet P1_ACK to report the connection statuses. The contents of the payload 34 of the first ACK packet P1_ACK sent by the primary network switch 24_2 may be shown in Table 2 below. In Table 2, the sender address 341 is the MAC address "MAC2" of the primary network switch 24_2, and the partner address 342 is the MAC address "MAC1" of the backup network switch 24_1. The link number 343 is the number of the subnets connected by the primary network switch 24_2, and the 2 pairs of the link ID 344 and the connection status 345 respectively carry the connection statuses of link L12 and L13 between the primary network switch 24_2 and the subnets N5 and N6. As shown in Table 2, when the connection statuses 345 are all link-up, it means that the links L12 and L13 connecting the primary network switch 24_2 to the subnets N5 and N6 are operating normally. It should be noted that the first ACK packet P1_ACK needs to carry the connection statuses of all the subnets (N5 and N6) connected to the primary network switch 24_2.

TABLE 2

| Command 340 | CM2 |
|---|---|
| Sender address 341 | MAC2 |
| Partner address 342 | MAC1 |
| Link number 343 | 2 |
| Link ID 344 | 5 |
| Connection status 345 | link-up |
| Link ID 344 | 6 |
| Connection status 345 | link-up |

The contents of the payload 34 of the first ACK packet P1_ACK sent by the primary network switch 24_3 may be shown in Table 3 below. In Table 3, the sender address 341 is the MAC address "MAC3" of the primary network switch 24_3, and the partner address 342 is the MAC address "MAC1" of the backup network switch 24_1. The link number 343 is the number of the subnets connected by the primary network switch 24_3, and the pair of the link ID 344 and the connection status 345 carries the connection status of link L14 between the primary network switch 24_3 and the subnet N7. As shown in Table 3, when the connection status 345 is link-up, it means that the link L14 connecting the primary network switch 24_3 to the subnet N7 is operating normally.

TABLE 3

| Command 340 | CM2 |
|---|---|
| Sender address 341 | MAC3 |
| Partner address 342 | MAC1 |
| Link number 343 | 1 |
| Link ID 344 | 7 |
| Connection status 345 | link-up |

In Step 406, the backup network switch 24_1 receives the first ACK P1_ACK packets from the primary network switches 24_2 and 24_3. Through the first ACK packet P1_ACK, the backup network switch 24_1 may obtain the connection statuses between the primary network switches

24_2-24_3 and the subnets N5-N7. When the backup network switch 24_1 does not receive the first ACK packet P1_ACK from one of the primary network switches 24_2-24_3, the backup network switch 24_1 should confirm whether the first condition is met to determine whether to perform link change. The first condition may be the condition that the first ACK packet P1_ACK from the same primary network switch is not received for more than a predetermined number of times or more than a predetermined time, and is not limited thereto. When the first condition is satisfied, the backup network switch 24_1 may determine that the primary network switch has failed (or malfunctioned), and perform link change for backup. Please refer to FIG. 5B, which illustrates the situation when the primary network switch 24_2 fails. When the primary network switch 24_2 fails, the backup network switch 24_1 will not be able to receive the first ACK packet P1_ACK sent by the primary network switch 24_2. When the first condition is satisfied, for example, the backup network switch 24_1 sends the first control packet P1 to the main network 20 three times in a row, but only receives the first ACK packets P1_ACK from the primary network switch 24_3 without the first ACK packets P1_ACK from the primary network switch 24_2, the backup network switch 24_1 may determine that the primary network switch 24_2 has failed or malfunctioned. In this situation, the backup network switch 24_1 may perform link change to backup for the primary network switch 24_2. As shown in FIG. 5B, the backup network switch 24_1 may enable the ports (set to a forwarding state) connected to the subnets N5 and N6, and forward data between the main network 20 and the subnets N5-N6 through the links L9 and L10. Accordingly, the backup network switch is capable of detecting whether a primary network switch fails and providing backup for the primary network switch. It should be noted, the backup network switch 24_1 may store information related to the subnets connected to the primary network switches 24_2 and 24_3 respectively (obtained through the first ACK packets P1_ACK before the device fails). Therefore, when the primary network switches 24_2 or 24_3 have been determined to be failed, the stored information may be loaded, and the links of the subnets connected to the failed primary network switches may be switched accordingly.

Figure 6A:
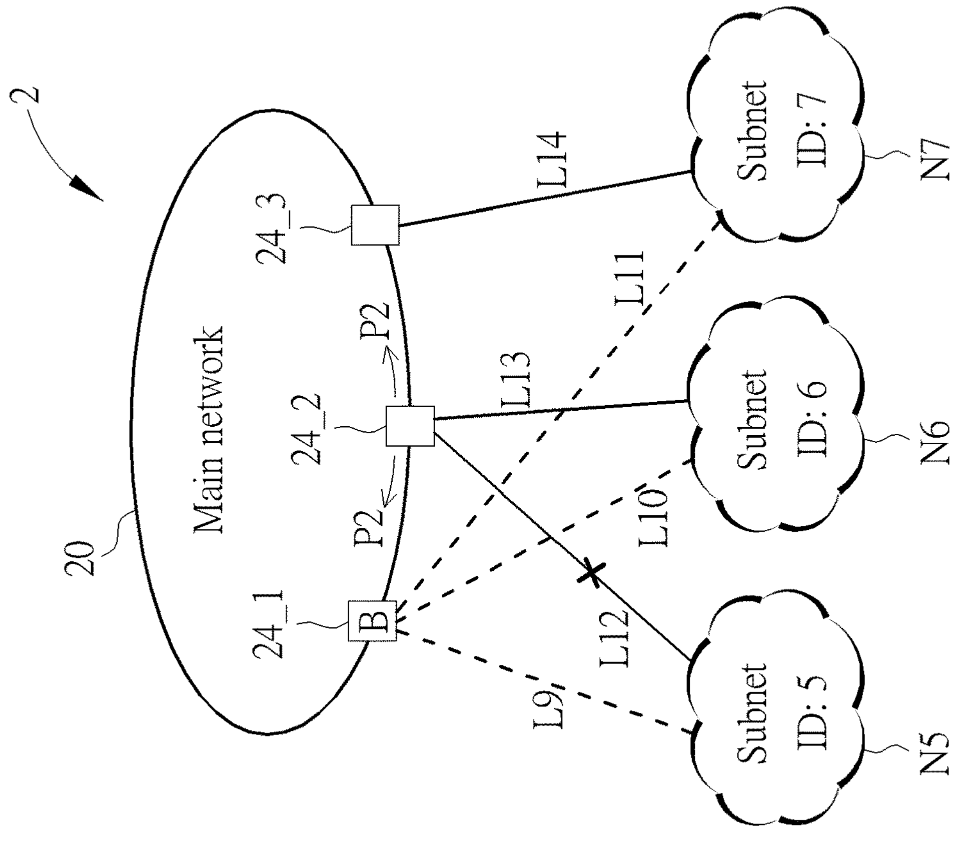
FIG. 6A and FIG. 6B are schematic diagrams of another implementation of one of the network coupling redundancy processes for the group according to an embodiment of the present invention.
Figure 6B:
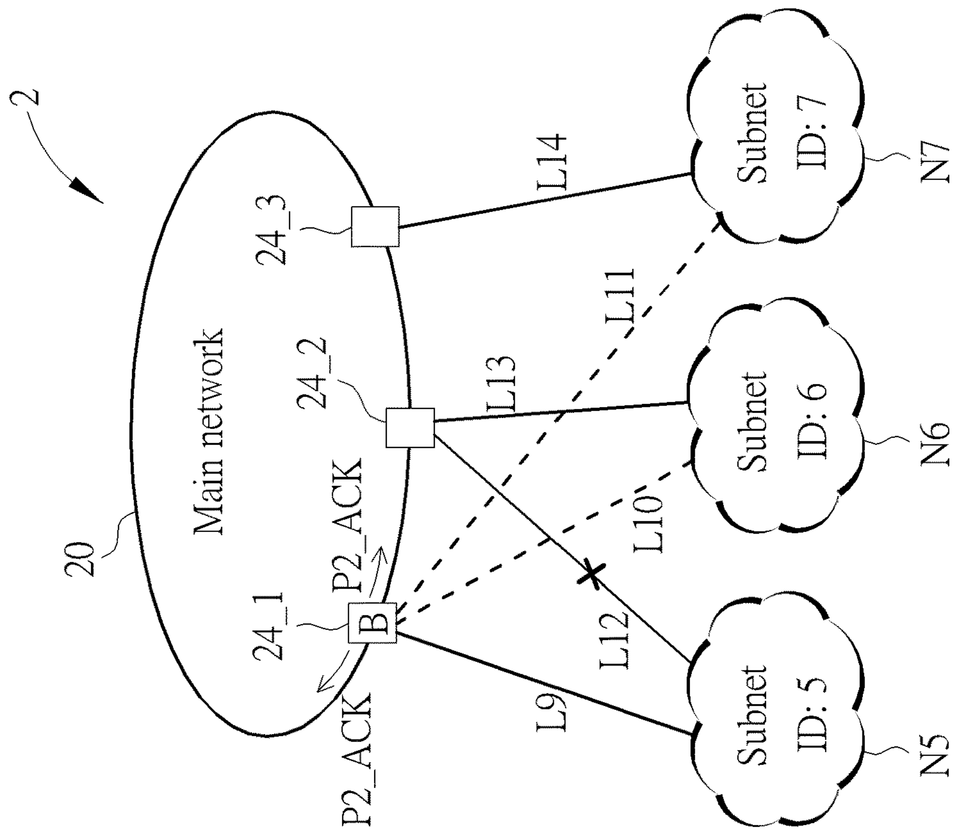

Please refer to FIG. 6A and FIG. 6B, which illustrate another implementation of the group G2 of the network system 2 performing the network coupling redundancy process 4. Please refer to FIG. 6A first. In Step 408, when the primary network switch 24_2 satisfies a second condition, a second control packet P2 is sent to request link change. The second condition may comprise a situation where the link backed up by the backup network switch 24_1 has to be switched back when the primary network switch 24_2 is activated or resumes operation or when the primary network switch 24_2 detects that the state of the connected link resumes the link-up state from the link-down state. On the other hand, the second condition may also comprise the situation that when the primary network switch 24_2 detects that the connected link fails, the data forwarding needs to be handed over to the backup network switch 24_1 for backup. The second control packet P2 at least carries a connection status of a subnet corresponding to the link to be switched, so that the backup network switch is able to perform link change according to the second control packet P2.

As an example, the primary network switch 24_2 detects that the link L12 between the primary network switch 24_2 and the subnet N5 has failed as shown in FIG. 6A, the primary network switch 24_2 may send a second control packet P2 to the main network 20 to notify the backup network switch 24_1 to switch the link for backup. The contents of the payload 34 of the second control packet P2 sent by the primary network switch 24_2 may be shown in Table 4 below. In Table 4, the sender address 341 is the MAC address "MAC2" of the primary network switch 24_2, and the partner address 342 is the MAC address "MAC1" of the backup network switch 24_1. The link number 343 is the number of the subnets connected by the primary network switch 24_2 and the links thereof need to be switched. The pair of the link ID 344 and the connection status 345 carries the connection status of link L12 between the primary network switch 24_2 and the subnet N5. As shown in Table 4, the link ID 344 of the subnet connected to the primary network switch 24_2 is 5, and the corresponding connection status 345 is link-down. In other words, the second control packet P2 carries the operating status (link-down) of the link L12 between the primary network switch 24_2 and the subnet N5. It should be noted that the second control packet P2 only needs to carry the connection status of the link L12 that needs to be switched, and does not need to carry the connection status of the link L13 whose connection status has not changed.

TABLE 4

| Command 340 | CM3 |
|---|---|
| Sender address 341 | MAC2 |
| Partner address 342 | MAC1 |
| Link number 343 | 1 |
| Link ID 344 | 5 |
| Connection status 345 | link-down |

Please refer to FIG. 6B. According to the network coupling redundancy process 4, in Step 410, after receiving the second control packet P2, the backup network switch 24_1 sends a second ACK packet P2_ACK. The contents of the payload 34 of the second ACK packet P2_ACK sent by the backup network switch 24_1 may be shown in Table 5 below. In Table 5, the sender address 341 is the MAC address "MAC1" of the backup network switch 24_1, and the partner address 342 is the MAC address "MAC2" of the primary network switch 24_2 that sent the second control packet P2. The link number 343 is the number of the subnets connected by the backup network switch 24_1 and the links thereof need to be switched. The pair of the link ID 344 and the connection status 345 carries the connection status of link L9 between the backup network switch 24_1 and the subnet N5. As shown in Table 5, the second ACK packet P2_ACK carries the subnet ID 5 of the subnet N5 connected to the backup network switch 24_1, and the corresponding connection status 345 is link-up. Therefore, the connection between the main network 20 and the subnet N5 may be switched from the failed link L12 connected to the primary network switch 24_2 to the link L9 connected to the backup network switch 24_1. During this process, the backup network switch 24_1 has to change the port connected to the link L9 from the blocking state to the forwarding state, so as to forward data between the main network 20 and the subnet N5. It should be noted, the second ACK packet P2_ACK only needs to carry the link status information corresponding to the subnet in the second control packet P2, i.e., the link status of the link L9 corresponding to the subnet N5.

TABLE 5

| Command 340 | CM4 |
|---|---|
| Sender address 341 | MAC1 |
| Partner address 342 | MAC2 |
| Link number 343 | 1 |
| Link ID 344 | 5 |
| Connection status 345 | link-up |

According to the network coupling redundancy process 4, in Step 410, after receiving the second ACK packet P2_ACK from the backup network switch 24_1, the primary network switch 24_2 has to change the port connected to the link L12 from the forwarding state to the blocking state, and change the main network switch 24_2 to the blocking state. Then, the data forwarding between the main network 20 and the subnet N5 will be handed over to the link L9 and performed by the backup network switch 24_1.

On the other hand, according to the network coupling redundancy process 4, when the primary network switch 24_2 detects that the link L12 between the primary network switch 24_2 and the subnet N5 is restored, the primary network switch 24_2 may send the second control packet P2 to the main network 20 again to request link change. The contents of the payload 34 of the second control packet P2 may be shown in Table 6 below. In Table 4, the link ID 344 carrying the subnet connected to the primary network switch 24_2 is 5, and the corresponding connection status 345 is link-up. In other words, the link L12 resumes the link-up state. When receiving the second control packet P2, the backup network switch 24_1 may reply with the second ACK packet P2_ACK and perform link change. That is to say, the connection between the main network 20 and the subnet N5 may be switched from the link L9 connected by the backup network switch 24_1 to the link L12 connected by the primary network switch 24_2. During this process, the backup network switch 24_1 has to change the port connecting to the link L9 from the forwarding state to the blocking state to continue to standby as a backup, while the primary network switch 24_2 has to change the port connecting to the link L12 from the blocking state to the forwarding state to forward the data between the main network 20 and the subnet N5 again.

TABLE 6

| Command 340 | CM3 |
|---|---|
| Sender address 341 | MAC2 |
| Partner address 342 | MAC1 |
| Link number 343 | 1 |
| Link ID 344 | 5 |
| Connection status 345 | link-up |

Accordingly, the network system 2 divides the network switches of the main network 20 into the plurality of switch groups by means of grouping, which are connected to the plurality of subnet groups. By specially setting the multicast address (destination address 31) in the control packet, the switch groups do not interfere with each other. In each switch group, a backup network switch may simultaneously back up multiple primary network switches, thus reducing the number of required devices. Furthermore, the switch group realizes the redundancy method of network coupling through the exchange of control packets. The control packets carry the connection status of a plurality of links at the same time, which effectively reduces the number of control packets in circulation, and is compatible with various ways of connecting between the primary network switches and the subnets at the same time.

Figure 7A:
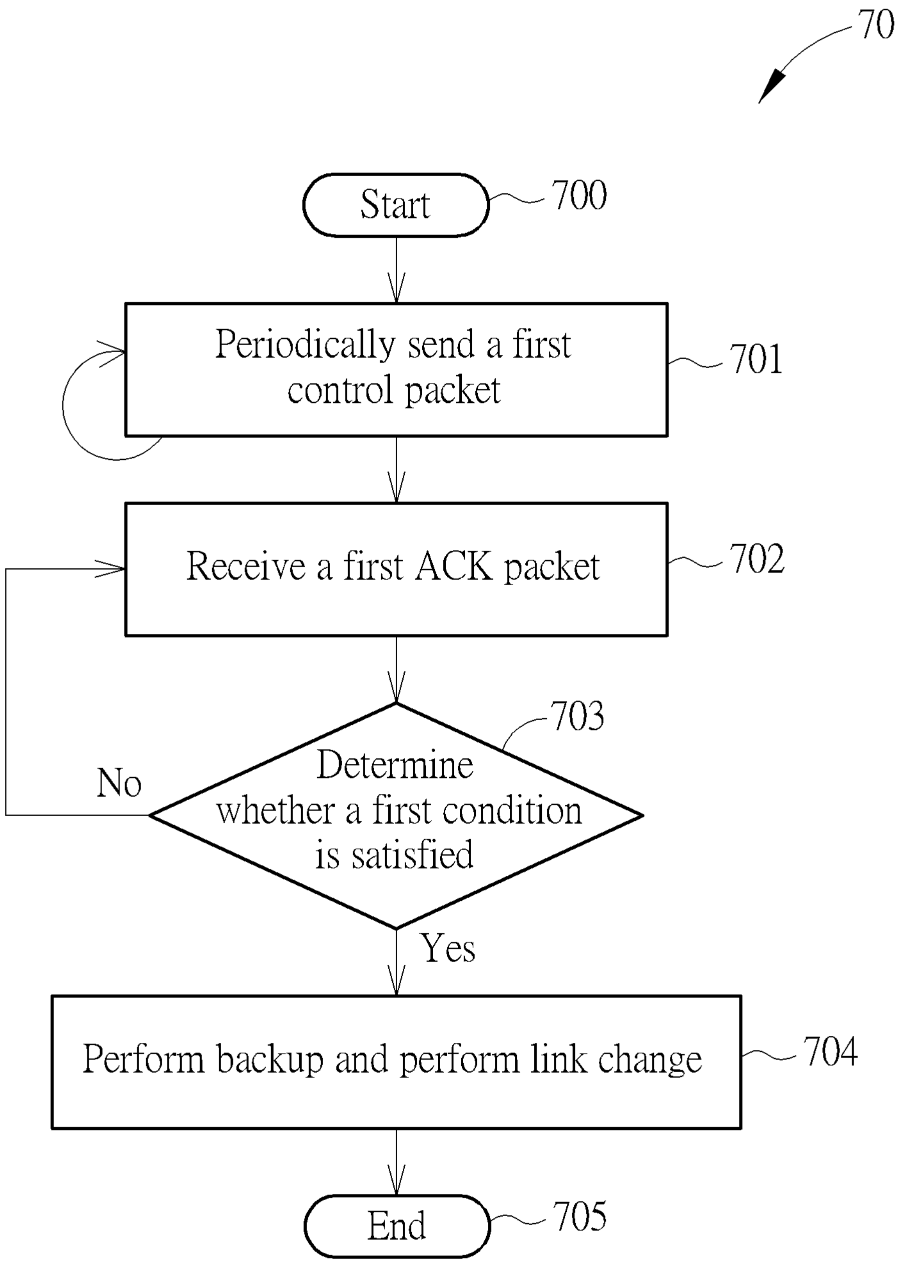
FIG. 7A and FIG. 7B are schematic diagrams of a network coupling redundancy method implemented by a backup network switch according to an embodiment of the present invention.
Figure 7B:
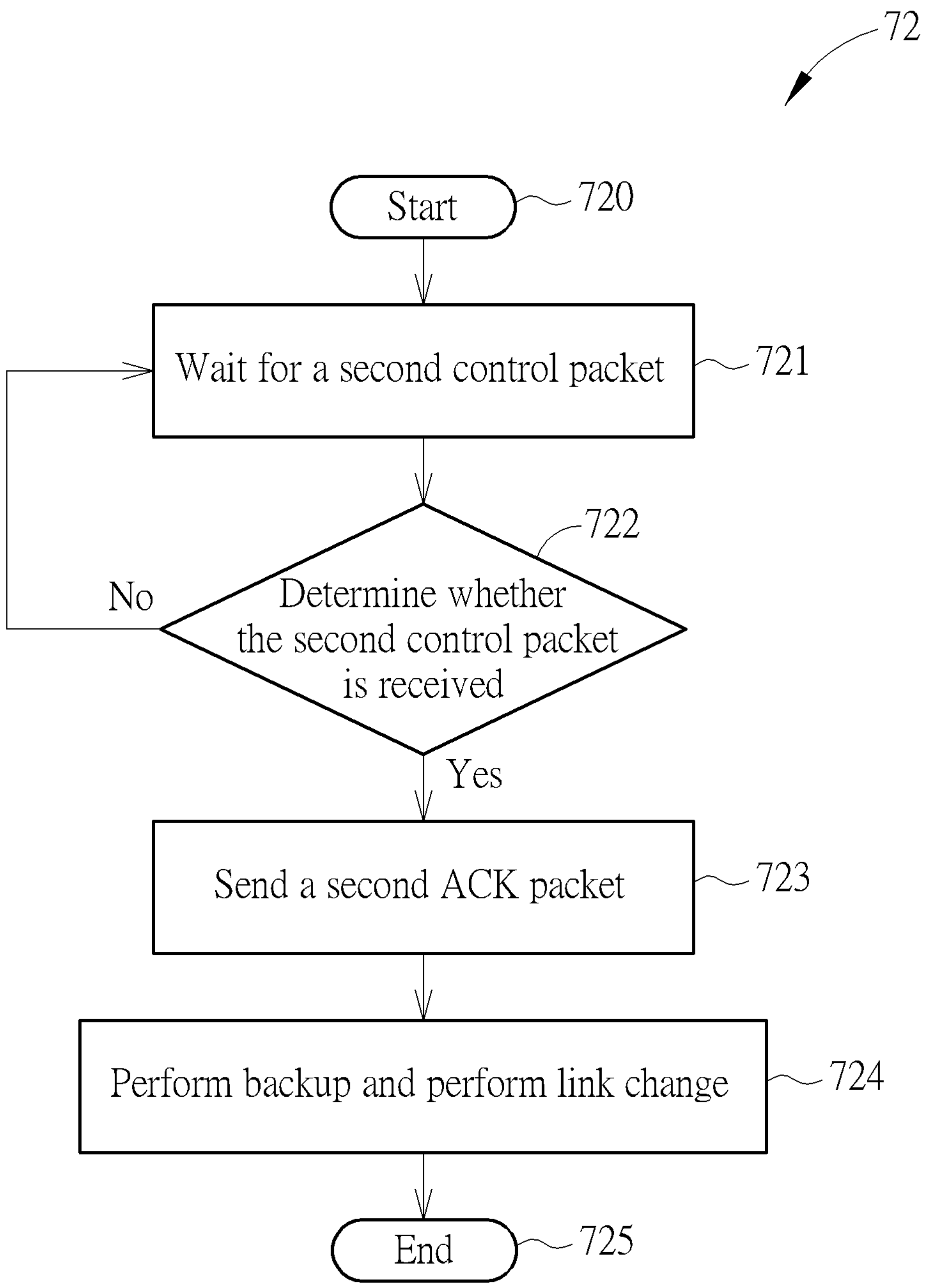

About the network coupling redundancy method implemented by the backup network switch mentioned above may be summarized into processes 70 and 72 as shown in FIG. 7A and FIG. 7B (taking the backup network switch 24_1 as an example). The process 70 comprises the following steps:

Step 700: Start.

Step 701: Periodically send a first control packet.

Step 702: Receive a first ACK packet.

Step 703: Determine whether a first condition is satisfied? If yes, proceed to Step 704; otherwise, proceed to Step 702.

Step 704: Perform backup and perform link change.

Step 705: End.

According to the process 70, in Step 701, the backup network switch 24_1 periodically sends a first control packet to the main network 20 or the subnets N5-N7, and the first control packet comprises the connection status between the backup network switch 24_1 and the subnets N5-N7. In Step 702, the backup network switch 24_1 receives first ACK packets from the primary network switches 24_2 and 24_3 belonging to the same group. In Step 703, the backup network switch 24_1 determines the operating status of the primary network switches 24_2 and 24_3 based on the received first ACK packets. When the received first ACK packets meet the first condition, the backup network switch 24_1 determines that one of the primary network switches 24_2 and 24_3 has failed, and executes Step 704. Taking the failure of the primary network switch 24_2 as an example, in Step 704, the backup network switch 24_1 provides backup for the primary network switch 24_2 and performs link change. The subnets N5 and N6, which are originally connected by the primary network switch 24_2, are instead connected by the backup network switch 24_1 through links L9 and L10 for data forwarding between the main network 20 and the subnets N5 and N6.

While the backup network switch executes the process 70, the process 72 is also executed in parallel to monitor whether there is a second control packet sent from the primary network switch. The process 72 comprises the following steps:

Step 720: Start.

Step 721: Wait for a second control packet.

Step 722: Determine whether the second control packet is received. If yes, proceed to Step 723; otherwise, proceed to Step 721.

Step 723: Send a second ACK packet.

Step 724: Perform backup and perform link change.

Step 725: End.

According to the process 72, in Step 721, the backup network switch 24_1 continues to monitor the second control packets sent from the primary network switches 24_2 and 24_3 of the same group, and the second control packet comprises the connection statuses between the primary network switch and the connected subnets. In Step 722, the backup network switch 24_1 determines whether the second control packet is received. If the second control packet is received, the backup network switch 24_1 executes Step 723. Taking the backup network switch 24_1 receiving the second control packet from the primary network switch 24_2 as an example, in Step 723, the backup network switch 24_1 sends a second ACK packet to the primary network switch 24_2. Then, in Step 724, the backup network switch 24_1 performs link change according to the connection status carried in the second control packet.

Figure 8A:
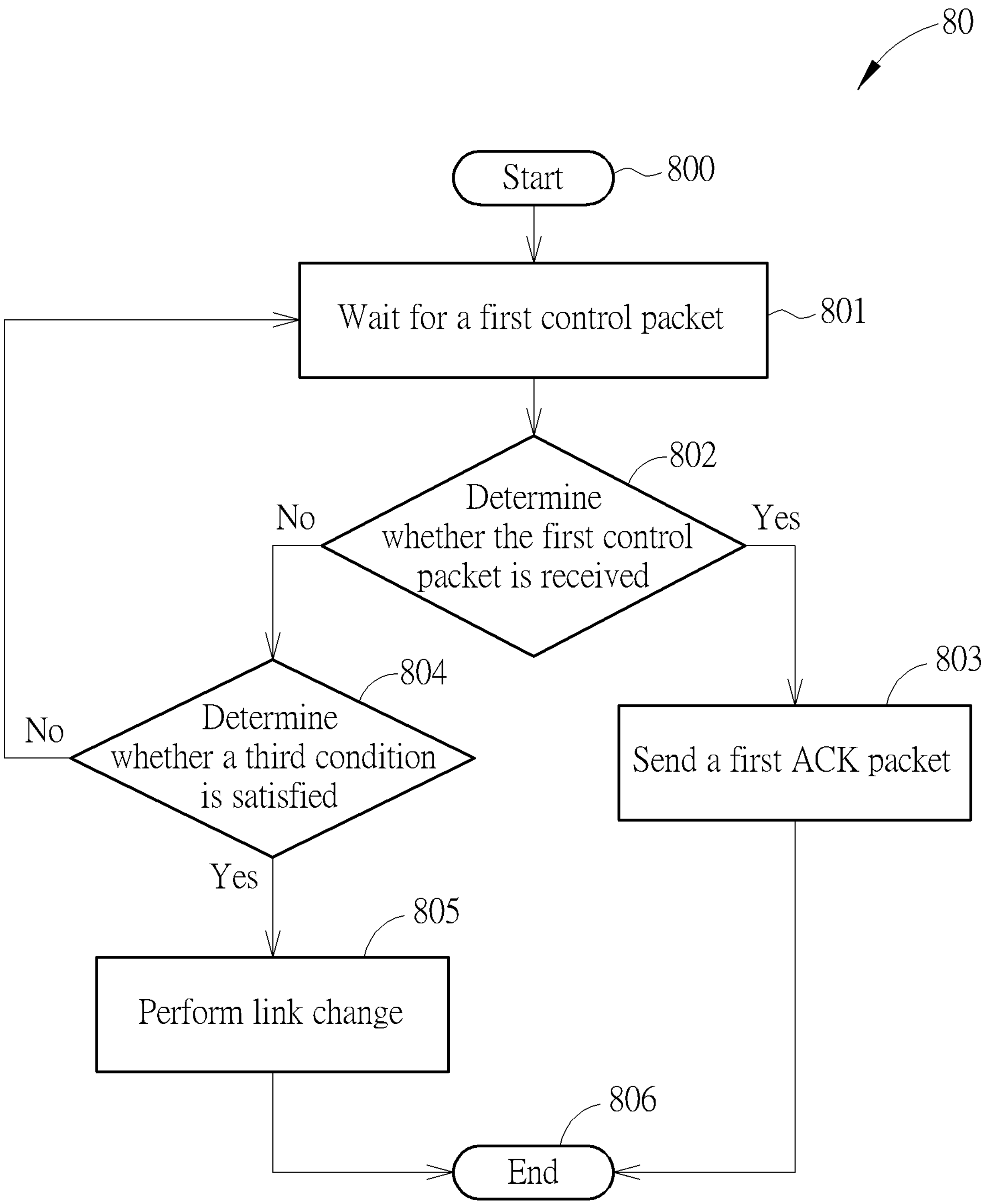
FIG. 8A and FIG. 8B are schematic diagrams of a network coupling redundancy method implemented by a primary network switch according to an embodiment of the present invention.
Figure 8B:
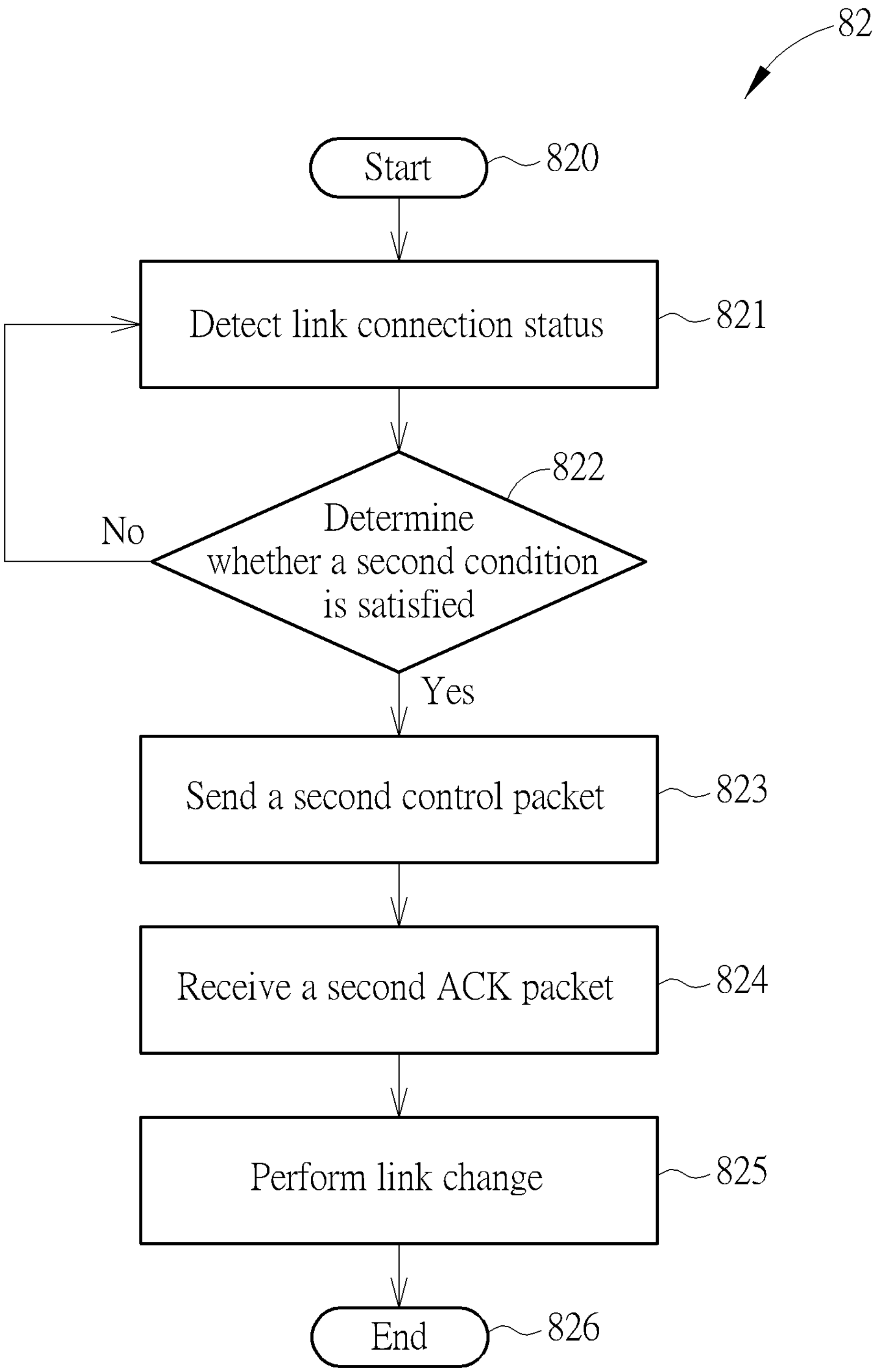

The network coupling redundancy method implemented by the primary network switch mentioned above may be summarize into processes 80 and 82 as shown in FIG. 8A and FIG. 8B (taking the primary network switch 24_2 as an example). The process 80 comprises the following steps:

Step 800: Start.

Step 801: Wait for a first control packet.

Step 802: Determine whether the first control packet is received. If yes, proceed to Step 803; otherwise, proceed to Step 804.

Step 803: Send a first ACK packet.

Step 804: Determine whether a third condition is satisfied. If yes, proceed to Step 805; otherwise, proceed to Step 801.

Step 805: Perform link change.

Step 806: End.

According to the process 80, in Step 801, the primary network switch 24_2 waits for a first control packet from the backup network switch 24_1 in the same group, and determines whether the first control packet is received in Step 802. If the first control packet is received by the primary network switch 24_2, the primary network switch 24_2 may determine that the backup network switch 24_1 is operating normally, and then send a first ACK packet to the backup network switch 24_1 in Step 803. If the first control packet is not received by the primary network switch 24_2, the primary network switch 24_2 has to determine whether a third condition is met in Step 804 for subsequent processing. The third condition comprises determining that the backup network switch 24_1 has failed and the connection status of a link connected to the primary network switch 24_2 is link-up and the corresponding port is not in the forwarding state. Determining whether the backup network switch 24_1 has failed may be based on not receiving the first control packet sent by the backup network switch 24_1 for more than a predetermined time, and is not limited thereto. When the third condition is met, the primary network switch 24_2 performs link change in Step 805 to replace the link originally backed up by the failed backup network switch 24_1. The first ACK packet comprises the connection status of the links L12 and L13 between the primary network switch 24_2 and the connected subnets N5 and N6.

While the primary network switch executes the process 80, the process 82 is also executed in parallel to notify the backup network switch when link change is required. The process 82 comprises the following steps:

Step 820: Start.

Step 821: Detect link connection status.

Step 822: Determine whether a second condition is satisfied. If yes, proceed to Step 823; otherwise, proceed to Step 821.

Step 823: Send a second control packet.

Step 824: Receive a second ACK packet.

Step 825: Perform link change.

Step 826: End.

According to the process 82, in Step 821, the primary network switch 24_2 continues to detect the connection status between the primary network switch 24_2 and the subnets N5 and N6. In Step 822, the primary network switch 24_2 determines whether a second condition is satisfied. If the second condition is satisfied, the primary network switch 24_2 executes Step 823. Taking the failure of the link L12 between the primary network switch 24_2 and the subnet N5 as an example, the primary network switch 24_2 sends a second control packet to the backup network switch 24_1 in Step 823. The contents of the payload 34 of the second control packet are shown in Table 4, in which the link L12 connected to the subnet N5 is in a non-connected state (link-down), and the backup network switch 24_1 may perform link change accordingly. Next, in Step 824, the primary network switch 24_2 receives a second ACK packet from the backup network switch 24_1. Finally, in Step 825, the primary network switch 24_2 performs link change.

In the embodiment of the present invention, the first control packet and the first confirmation packet may carry connection statuses of the links related to multiple subnets at the same time, and thus the number of packets may be effectively reduced. The second control packet and the second confirmation packet may carry only the subnets that need to perform link change and the corresponding link information, and thus the amount of information in the packets may be reduced. Moreover, through this mechanism, network configuration errors may be detected and fault-tolerated, and error messages may be reported.

Figure 9:
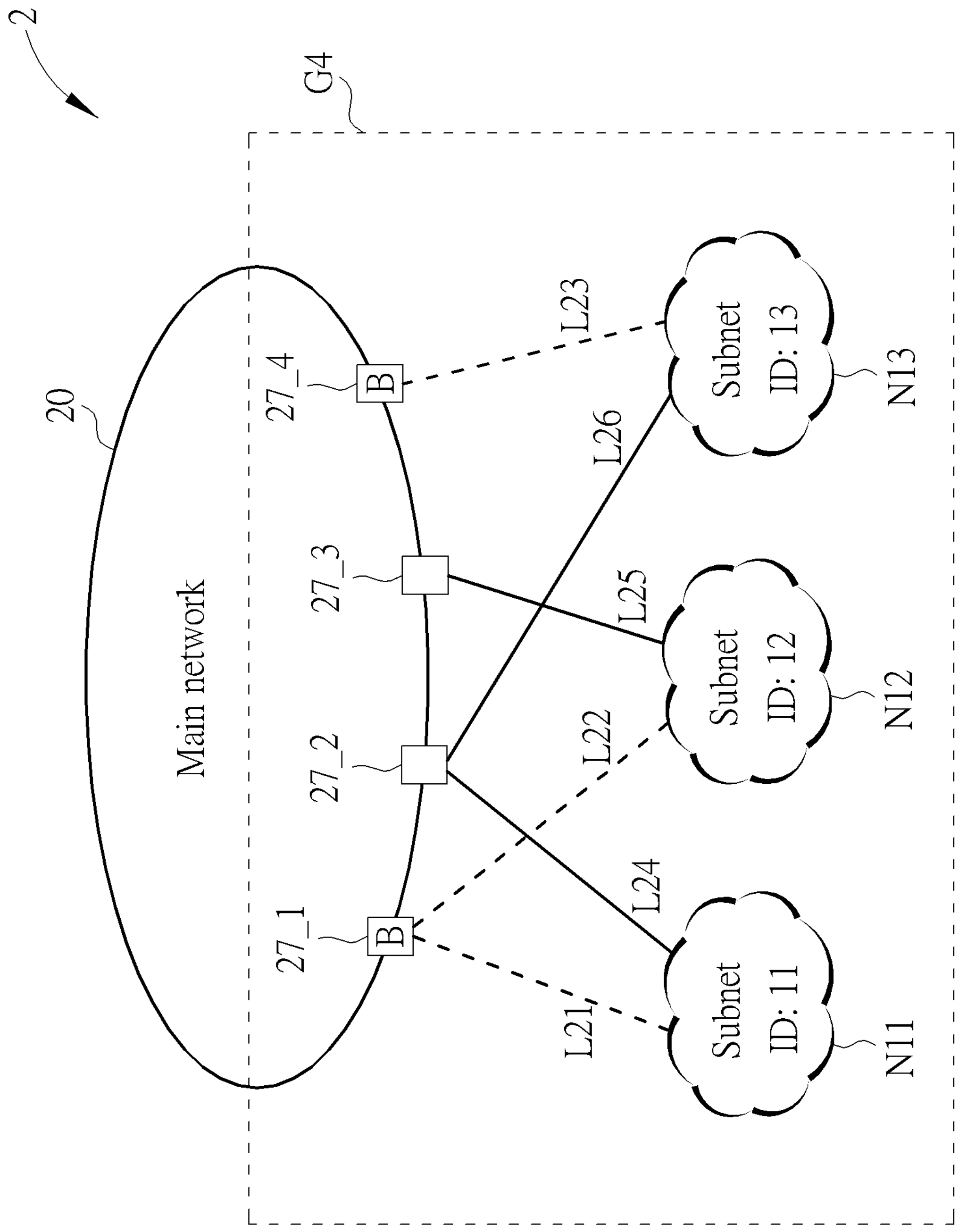
FIG. 9 is a schematic diagram of an incorrect network configuration according to an embodiment of the present invention.

Please refer to FIG. 9, which is a schematic diagram of an incorrect configuration according to an embodiment of the present invention. FIG. 9 illustrates a network coupling configuration of another group G4 in the network system 2. Specifically, the group G4 comprises subnets N11-N13, primary network switches 27_2-27_3 and backup network switches 27_1 and 27_4. As shown in FIG. 9, the backup network switch 27_1 is coupled to the subnets N11 and N12 through links L21 and L22, and the backup network switches 27_4 is coupled to the subnet N13 through a link L23. The primary network switch 27_2 is coupled to the subnets N11 and N13 through links L24 and L26, and the primary network switch 27_3 is coupled to the subnet N12 through a link L25. As can be seen in FIG. 9, two backup network switches are incorrectly configured in the group G4. When the backup network switches 27_1 and 27_4 send the first control packet and receive the first ACK packet sent from the primary network switches 27_2 and 27_3, the incorrect connection status may be detected through the first ACK packets. Specifically, when the backup network switch 27_1 receives the first ACK packet from the primary network switch 27_2, the information about the subnets N11 and N13 connected to the primary network switch 27_2 may be obtained through the link ID 344 after parsing the first ACK packet. Since the subnet N13 does not belong to one of the subnets N11 and N12 connected to the backup network switch 27_1, the backup network switch 27_1 may detect an incorrect network configuration in the group G4. Similarly, the backup network switch 27_4 may also discover through the first acknowledgment packet that the primary network switches 27_2 and 27_3 are respectively connected to the subnets N11 and N12 that are not connected to the backup network switch 27_4, and therefore the backup network switch 27_4 may detect incorrect network configuration in the group G4. In this situation, the backup network switches 27_1 and 27_4 may continue to operate and report error messages as long as there is no conflict in the connection with the subnets.

Figure 10:
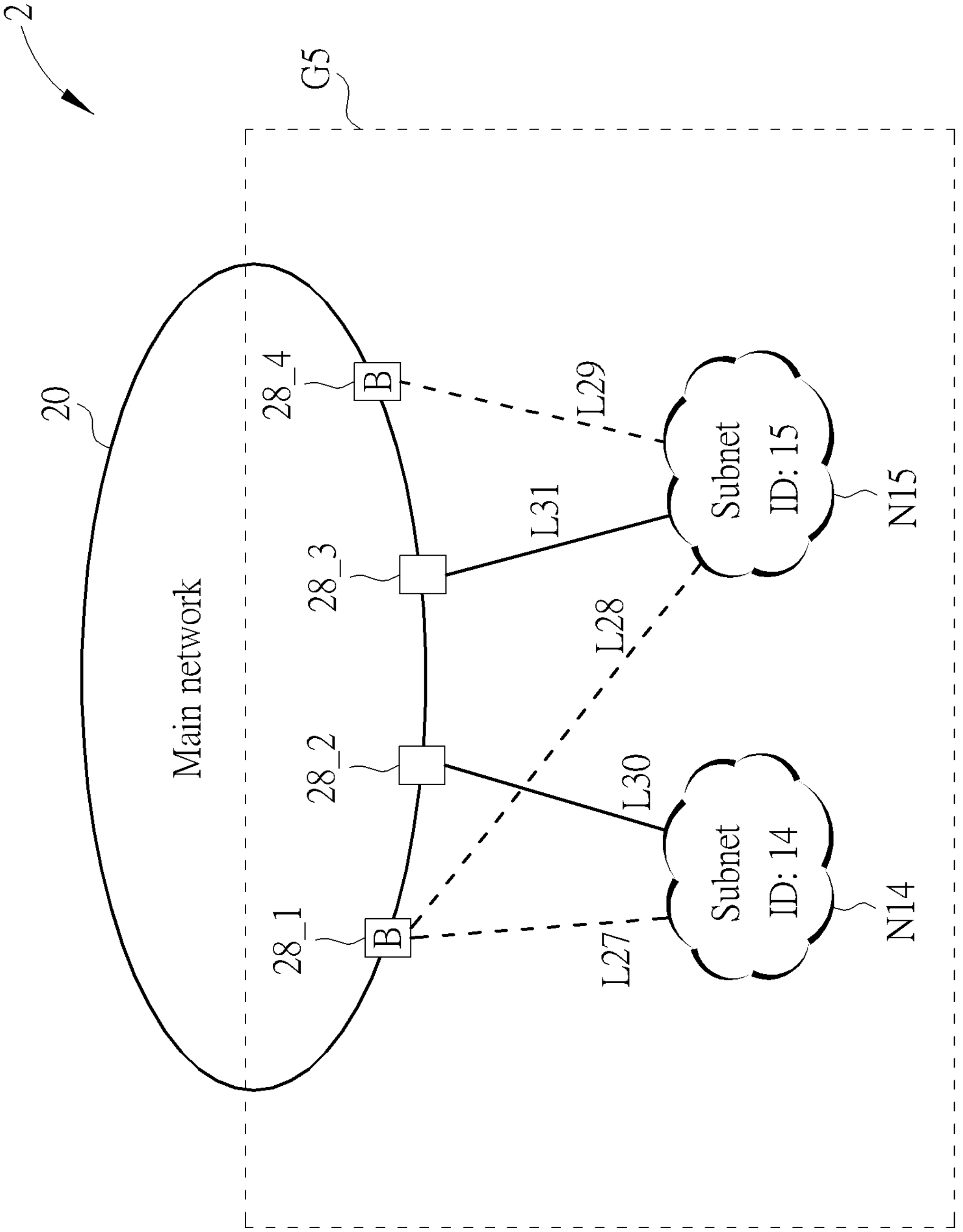
FIG. 10 is a schematic diagram of an incorrect network configuration according to an embodiment of the present invention.

Please refer to FIG. 10, which is a schematic diagram of another incorrect configuration according to an embodiment of the present invention. FIG. 10 illustrates a network coupling configuration of another group G5 in the network system 2. Specifically, the group G5 comprises subnets N14 and N15, primary network switches 28_2-28_3 and backup network switches 28_1 and 28_4. As shown in FIG. 10, the backup network switch 28_1 is coupled to the subnets N14 and N15 through links L27 and L28, and the backup network switches 28_4 is coupled to the subnet N15 through a link L29. The primary network switch 28_2 is coupled to the subnet N14 through a link L30, and the primary network switch 28_3 is coupled to the subnet N15 through a link L31. As can be seen in FIG. 10, two backup network switches are incorrectly configured in the group G5, and the two backup network switches 28_1 and 28_4 are connected to the subnet N15 at the same time. In this situation, the primary network switches 28_2 and 28_3 may detect the incorrect connection status through the first control packet or the second ACK packet from the backup network switches 28_1 and 28_4. Specifically, the primary network switch 28_3 may receive the first control packet from the backup network switch 28_1, and thus obtain the information of the backup network switch 28_1 connected to the subnet N15 through the link ID 344 after parsing the first control packet. Similarly, the primary network switch 28_3 may also receive the first control packet from the backup network switch 28_4, and thus obtain the information of the backup network switch 28_4 connected to the subnet N15 through the link ID 344 after parsing the first control packet. Accordingly, the primary network switch 28_3 may detect an incorrect network configuration in the group G5 and report an error message. In this situation, when the primary network switch 28_3 sends the first ACK packet, the receiver will be the one with smaller MAC address among the two backup network switches 28_1 and 28_4. Assume that the backup network switch 28_1 has the smaller MAC address. That is to say, in the first ACK packet sent by the primary network switch 28_3, the partner address 342 will be set as the MAC address of the backup network switch 28_1. In this situation, when the primary network switch 28_3 detects that the link L31 fails, the primary network switch 28_3 will send the second control packet to the backup network switch 28_1. In other words, in the second control packet sent by the primary network switch 28_3, the partner address 342 will also be set as the MAC address of the backup network switch 28_1.

It should be noted, although the primary network switch 28_3 sends the first ACK packet and the second control packet to the backup network switch 28_1, the backup network switch 28_4 belonging to the same group G5 may also receive the first ACK packet and the second control packet from the primary network switch 28_3. Specifically, as mentioned above, the control packets of the same group are sent to the main network 20 by multicast through the destination address 31 with the group ID. Therefore, all of the network switches 28_1-28_4 belonging to the same group are able to read and parse the control packets sent by each other. Therefore, the backup network switch 28_4 is also able to parse the first ACK packet and the second control packet sent from the primary network switch 28_3 to the backup network switch 28_1, and then obtains information of the backup performed by another backup network switch 28_1 according to the partner address 342. In this situation, when the primary network switch 28_3 fails, the backup network switch 28_4 does not need to perform link change for backup. Accordingly, the network system 2 is capable of effectively detecting errors and tolerating errors.

Figure 11:
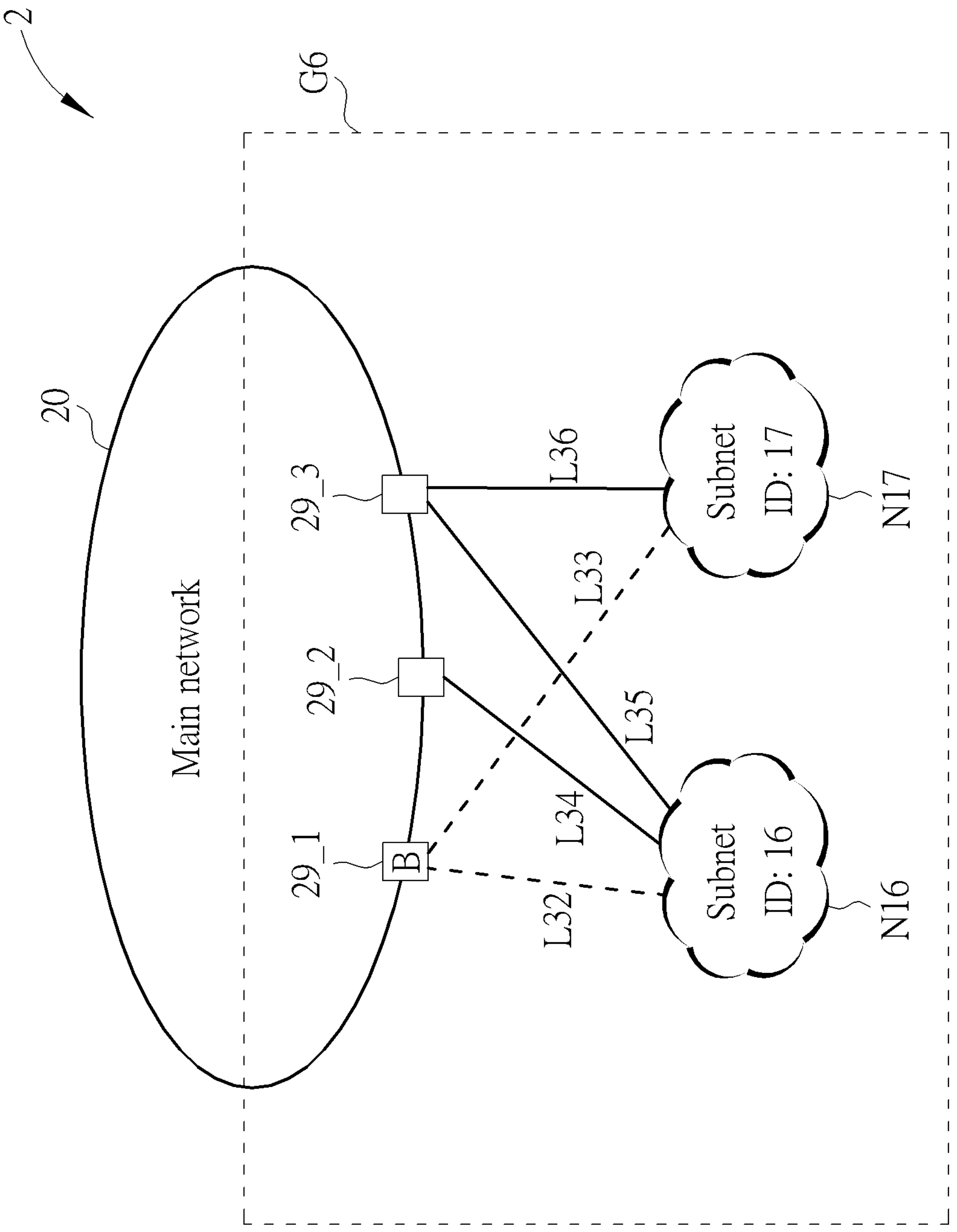
FIG. 11 is a schematic diagram of an incorrect network configuration according to an embodiment of the present invention.

Please refer to FIG. 11, which is a schematic diagram of another incorrect configuration according to an embodiment of the present invention. FIG. 11 illustrates a network coupling configuration of another group G6 in the network system 2. Specifically, the group G6 comprises subnets N16 and N17, primary network switches 29_2-29_3 and backup network switch 29_1. As shown in FIG. 11, the backup network switch 29_1 is coupled to the subnets N16 and N17 through links L32 and L33. The primary network switch 29_2 is coupled to the subnet N16 through a link L34, and the primary network switch 29_3 is coupled to the subnets N16 and N17 through links L35 and L36. As can be seen in FIG. 11, two primary network switches 29_2 and 29_3 are incorrectly configured to connect the subnet L16 in the group G6 at the same time. In this situation, the backup network switch 29_1 may detect the incorrect connection status through the first ACK packet or the second control packet sent from the primary network switches 29_2 and 29_3 and report an error message. Specifically, after sending a first control packet, the backup network switch 29_1 may receive a first ACK packet from the primary network switch 29_2. After parsing the first ACK packet, the backup network switch 29_1 may obtain the information that the primary network switch 29_2 is connected to the subnet N16 through the link ID 344. Similarly, the backup network switch 29_1 may also receive a first ACK packet from the primary network switch 29_3, and then obtain the information that the primary network switch 29_3 is connected to the subnets N16 and N17 through the link ID 344 after parsing the first ACK packet. Therefore, the backup network switch 29_1 is capable of detecting that the primary network switches 29_2 and 29_3 are simultaneously connected to the subnet L16.

Figure 12:
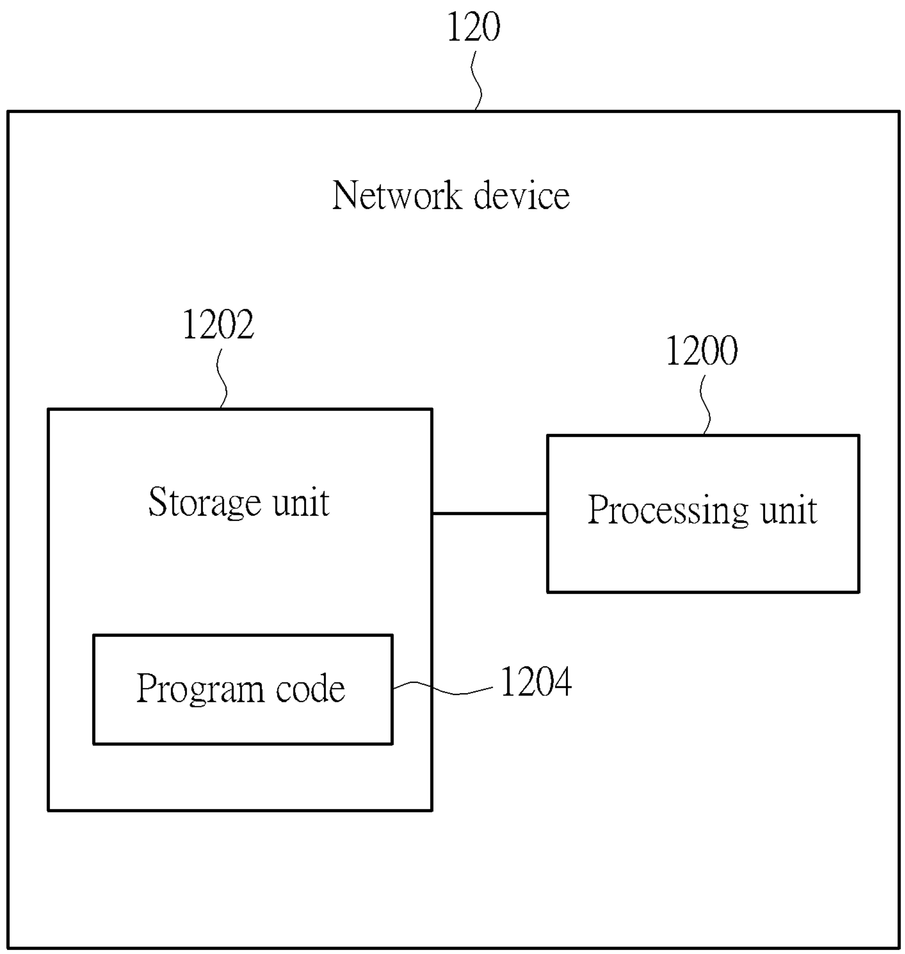
FIG. 12 is a schematic diagram of a network device according to an embodiment of the present invention.

Furthermore, please refer to FIG. 12, which is a schematic diagram of a network device 120 according to an embodiment of the present invention. The network device 120 may be used to implement the primary network switches 22_2-22_5, 24_2-24_3, 26_2, 27_2, 24_3, 28_2-28_3, 29_2-29_3 and the backup network switches 22_1, 24_1, 26_1, 27_1, 27_4, 28_1, 28_4, 29_1 of the embodiment of the present invention. As shown in FIG. 12, the network device 120 may comprise a processing unit 1200 and a storage unit 1202. The processing unit 1200 may be a general-purpose processor, a microprocessor, an application-specific integrated circuit (ASIC), etc. or a combination thereof. The storage unit 1202 is coupled to the processing unit 1200 and may be any type of data storage devices for storing a program code 1204, and the program code 1204 is read and executed by the processing unit 1200. For example, the storage unit 1202 may be a read-only memory (ROM), a flash memory, a random-access memory (RAM), a hard disk, an optical data storage device, a non-volatile storage unit, etc., and is not limited thereto. In addition, the network device 120 further comprises a plurality of ports (not illustrated in FIG. 12) for connecting a plurality of network devices of multiple subnets and a main network.

The network device 120 is used to represent the necessary components required to implement the embodiments of the present invention, and those skilled in the art may make various modifications and adjustments accordingly, and is not limited to this. For example, when the network device 120 is applied to implement the primary network switch, the processes 80 and 82 of the network coupling redundancy method may be complied into the program code 1204, stored in the storage unit 1202, and executed by the processing unit 1200. When the network device 120 is applied to implement the backup network switch, the processes 70 and 72 of the network coupling redundancy method may be complied into the program code 1204, stored in the storage unit 1202, and executed by the processing unit 1200. Moreover, the storage unit 1202 is also used for storing the information about the connection statuses between the network switches belonging to the same switch group and the subnets connected thereto, as well as the data required for running the network coupling redundancy method, and is not limited thereto.

In summary, the present invention provides a network coupling redundancy method, a device and a network architecture that can enable a backup network switch to backup for multiple primary network switches during network coupling, reducing the number of devices required. By dividing the network switches into multiple groups through grouping, the groups are not interfering with each other, thus reducing the number of control packets that need to be processed. In addition, the control packet is capable of carrying the connection statuses of multiple links at the same time, further reducing the number of control packets. Accordingly, the reliability and stability of the network coupling can be ensured while reducing cost and improving performance, thus improving the shortcomings of the prior arts.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A primary network switch, configured in a switch group of a main network, coupled to at least one first subnet of a subnet group through at least one first link, comprising:

a processing unit, configured to execute a program code; and a storage unit, coupled to the processing unit, configured to store the program code to instruct the processing unit to execute a network coupling redundancy method, wherein the network coupling redundancy method comprises:

receiving a first control packet from a backup network switch of the switch group;

in response to not receiving the first control packet, performing link change according to a first condition;

in response to receiving the first control packet, sending a first acknowledgment (ACK) packet comprising a connection status of the at least one first subnet;

sending a second control packet to the backup network switch; and in response to sending the second control packet, receiving a second ACK packet from the backup network switch, and performing link change after receiving the second ACK packet.

2. The primary network switch of claim 1, wherein the first condition comprises not receiving the first control packet from the backup network switch for a predetermined time and a link status of a link connected to the primary network switch being a linkup state and a corresponding port being not in a forward state.

3. The primary network switch of claim 1, wherein the first control packet, the first ACK packet, the second control packet, and the second ACK packet are sent by multicast, and destination addresses of the first control packet, the first ACK packet, the second control packet and the second ACK packet comprise a group identification (ID) of the switch group.

4. The primary network switch of claim 1, wherein the backup network switch is coupled to at least one second subnet of the subnet group through at least one second link, and the first control packet comprises a connection status of the at least one second subnet.

5. The primary network switch of claim 4, further performing an error detection for network configuration according to the connection status of the at least one second subnet carried in the first control packet.

6. The primary network switch of claim 1, wherein when the switch group comprises another backup network switch, a Media Access Control (MAC) address of the another backup network switch is greater than a MAC address of the backup network switch, and the primary network switch reports an error message.

7. The primary network switch of claim 1, wherein the step of sending the second control packet to the backup network switch comprises when the primary network switch resumes operation or when one of the at least one first link fails (link-down) or restores the connection (link-up), sending the second control packet to the backup network switch.

8. The primary network switch of claim 7, wherein the second control packet at least comprises a connection status of a subnet requiring performing link change.

9. A backup network switch, configured in a switch group of a main network, coupled to at least one first subnet of a subnet group through at least one first link, comprising:

a processing unit, configured to execute a program code; and a storage unit, coupled to the processing unit, configured to store the program code to instruct the processing unit to execute a network coupling redundancy method, wherein the network coupling redundancy method comprises:

periodically sending a first control packet comprising a connection status of the at least one first subnet to at least one primary network switch of the switch group;

in response to sending the first control packet, receiving at least one first acknowledgement (ACK) packet from the at least one primary network switch;

performing link change according to a first condition; and in response to receiving a second control packet from the at least one primary network switch, sending a second ACK packet and performing link change according to the second control packet.

10. The backup network switch of claim 9, wherein the first control packet, the at least one first ACK packet, the second control packet, and the second ACK packet are sent by multicast, and destination addresses of the first control packet, the at least one first ACK packet, the second control packet and the second ACK packet comprise a group identification (ID) of the switch group.

11. The backup network switch of claim 9, wherein each primary network switch of the at least one primary network switch is coupled to at least one second subnet of the subnet group through at least one second link, and each of the at least one ACK packet comprises a connection status of the at least one second subnet of the each primary network switch.

12. The backup network switch of claim 11, wherein the network coupling redundancy method further comprises performing an error detection for network configuration according to the connection status of the at least one second subnet carried in the at least one first ACK packet.

13. The backup network switch of claim 12, further reporting an error message when one of the at least one first ACK packet carries a connection status of a subnet that does not belong to the at least one first subnet.

14. The backup network switch of claim 12, further reporting an error message when different first ACK packets of the at least one first ACK packet carry connection statuses of the same subnet.

15. The backup network switch of claim 11, wherein the first condition comprises a number of times the first ACK packet being not received from a primary network switch of the at least one primary network switch; the step of performing link change according to the first condition is switching the at least one second link of the primary network switch when the number of times of the first condition exceeds a predetermined number.

16. The backup network switch of claim 9, wherein the step of performing link change according to the second control packet is performing link change according to a connection status of at least one subnet carried in the second control packet.

17. A network architecture for network coupling and backup, comprising:

a plurality of subnets, belonging to a plurality of subnet groups; and a main network, comprising a plurality of switch groups, wherein each switch group of the plurality of switch groups is coupled to a subnet group of the plurality of subnet groups and comprises:

at least one primary network switch, coupled to the subnet group, wherein each primary network switch of the at least one primary network switch is coupled to at least one first subnet of the subnet group through at least one first link; and a backup network switch, coupled to the subnet group through at least one second link;

wherein the each switch group of the plurality of switch groups is configured to execute a network coupling redundancy method, wherein the network coupling redundancy method comprises:

sending, by the backup network switch, a first control packet comprising a connection status of the at least one second link periodically;

in response to receiving the first control packet, the each primary network switch of the at least one primary network switch sending a first acknowledgement (ACK) packet comprising a connection status of the at least one first link;

performing, by the backup network switch, link change according to a first condition;

sending, by the at least one primary network switch, a second control packet according to a second condition;

in response to receiving the second control packet, the backup network switch sending a second ACK packet and performing link change according to the second control packet; and in response to receiving the second ACK packet, the at least one primary network switch performing link change.

18. The network architecture of claim 17, wherein the first control packet, the first ACK packet, the second control packet, and the second ACK packet are sent by multicast, and a destination address of each of the first control packet, the first ACK packet, the second control packet and the second ACK packet comprises a group identification (ID) of the corresponding switch group.

19. The network architecture of claim 17, wherein the first condition of the network coupling redundancy method comprises a number of times the first ACK packet being not received from a primary network switch of the at least one primary network switch by the backup network switch; and the step of the backup network switch performing link change according to the first condition is switching the at least one first link of the primary network switch when the number of times of the first condition exceeds a predetermined number.

20. The network architecture of claim 17, wherein the second condition of the network coupling redundancy method comprises when a primary network switch of the at least one primary network switch resumes operation or when one of the at least one first link fails (link-down) or restores the connection (link-up), the primary network switch sending the second control packet.

21. The network architecture of claim 17, wherein the step of performing link change according to the second control packet is performing link change according to a connection status of the at least one subnet carried in the second control packet.

* * * * *